(12) United States Patent
Takahashi

(10) Patent No.: US 7,623,727 B2
(45) Date of Patent: Nov. 24, 2009

(54) IMAGE BINARIZATION APPARATUS, IMAGE BINARIZATION METHOD, IMAGE PICKUP APPARATUS, IMAGE PICKUP METHOD, AND A COMPUTER PRODUCT

(75) Inventor: Sadao Takahashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 828 days.

(21) Appl. No.: 11/058,191

(22) Filed: Feb. 16, 2005

(65) Prior Publication Data

US 2005/0271294 A1 Dec. 8, 2005

Related U.S. Application Data

(63) Continuation of application No. 09/551,466, filed on Apr. 17, 2000, now Pat. No. 6,898,329.

(30) Foreign Application Priority Data

Apr. 21, 1999 (JP) .................................. 11-113761
Feb. 14, 2000 (JP) .............................. 2000-035946

(51) Int. Cl.
*G06K 9/38* (2006.01)
*G06K 9/00* (2006.01)

(52) U.S. Cl. ........................ 382/272; 382/172

(58) Field of Classification Search ................ 382/172, 382/272
See application file for complete search history.

(56) References Cited

U.S. PATENT DOCUMENTS

| 4,578,711 | A |   | 3/1986  | White et al. |
|-----------|---|---|---------|--------------|
| 4,599,656 | A | * | 7/1986  | Bellinghausen ............ 382/237 |
| 4,667,250 | A | * | 5/1987  | Murai ....................... 358/3.13 |
| 4,760,464 | A |   | 7/1988  | Sakano |
| 5,268,773 | A |   | 12/1993 | Park et al. |
| 5,313,533 | A | * | 5/1994  | Scott ........................... 382/273 |
| 5,450,163 | A |   | 9/1995  | Iwasaki |
| 5,469,267 | A |   | 11/1995 | Wang |
| 5,583,659 | A |   | 12/1996 | Lee et al. |
| 5,617,484 | A |   | 4/1997  | Wada et al. |
| 5,768,441 | A |   | 6/1998  | Yoshizawa et al. |
| 5,796,876 | A | * | 8/1998  | Wang et al. ................. 382/270 |

(Continued)

FOREIGN PATENT DOCUMENTS

JP 63-95779 4/1988

(Continued)

OTHER PUBLICATIONS

Zhao et al, "Binary character/graphics image extraction: a new technique and six evaluation aspects", 11th IAPR International Conference on Pattern Recognition, Sep. 1992.

(Continued)

*Primary Examiner*—Charles Kim
*Assistant Examiner*—Stephen R Koziol
(74) *Attorney, Agent, or Firm*—Oblon, Spivak, McClelland, Maier & Neustadt, L.L.P.

(57) ABSTRACT

In a digital camera, a CPU divides a multi-valued image into blocks and selects object blocks, which are to be the object of processing. A CCD outputs luminance values of the multi-valued image. A low luminance threshold value setter sets low luminance threshold values on the basis of mean luminance values of blocks adjacent to the object block. A mean luminance value calculator calculates mean luminance values using luminance values from which luminance values that do not reach the low luminance threshold value in a block have been removed. A binarization threshold value setting circuit sets a binarization threshold value of the block based on the mean luminance values. A binarizer then binarizes the multi-valued image in the block on the basis of the binarization threshold values.

36 Claims, 28 Drawing Sheets

U.S. PATENT DOCUMENTS 5,838,838 A * 11/1998 Overton ...................... 382/298
5,920,655 A * 7/1999 Makita et al. ............... 382/272
2001/0035975 A1 * 11/2001 Ishii .......................... 358/1.14

FOREIGN PATENT DOCUMENTS

| JP | 64-51586 | 2/1989 |
|---|---|---|
| JP | 3-237571 | 10/1991 |
| JP | 4-92982 | 3/1992 |
| JP | 7-212591 | 8/1995 |

OTHER PUBLICATIONS

Sadao Takahashi, "Thresholding Technique for Document Images from Digital Camera," Research and Development Center, Ricoh Co., Ltd.

* cited by examiner

FIG.2

| | | | | | | |
|---|---|---|---|---|---|---|
| | | | | | | |
| | | B4 | G5 | B5 | | |
| | R4 | G1 | R0 | G2 | R1 | |
| | G6 | B0 | G0 | B1 | G7 | |
| | R5 | G3 | R2 | G4 | R3 | |
| | | B2 | G8 | B3 | | |
| | | | | | | |

FIG.4A
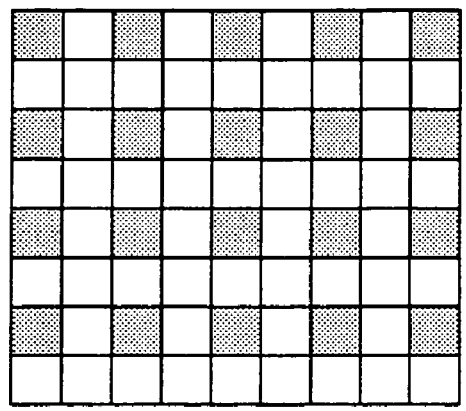
 : SAMPLED PIXELS
FIG.4B
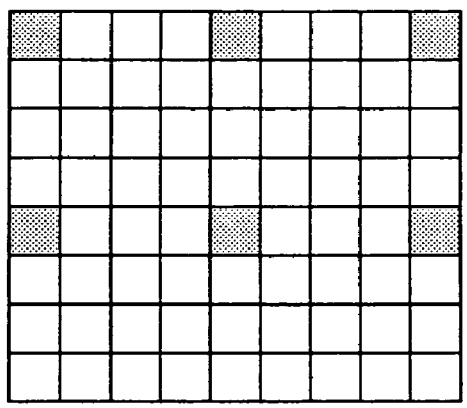
 : SAMPLED PIXELS

IMAGE BINARIZATION APPARATUS, IMAGE BINARIZATION METHOD, IMAGE PICKUP APPARATUS, IMAGE PICKUP METHOD, AND A COMPUTER PRODUCT

CROSS-REFERENCE TO RELATED APPLICATIONS

The present application is a continuation of U.S. application Ser. No. 09/551,466 filed on Apr. 17, 2000, and in turn claims priority to JP 11-113761 filed on Apr. 21, 1999, and JP 2000-035946 filed on Feb. 14, 2000, the entire contents of each of which are hereby incorporated herein by reference.

FIELD OF THE INVENTION

The present invention relates to an image binarization apparatus, an image pickup apparatus, an image binarization method, an image pickup method, and a computer product. More particularly, this invention relates to a technology an image is binarized after removing the shadows and unevenness in the brightness of a multi-valued image input using an image input apparatus having an inconstant light source.

BACKGROUND OF THE INVENTION

Conventionally, when saving a document as an electronic document generally a scanner, a camera, or the scanner section of a facsimile machine is used as an image input apparatus. In this type of scanner (scanner section), a light source is provided inside the apparatus and light emitted from the light source which is reflected from the document is read by a CCD or the like. If necessary, the read image is then binarized and saved. Because the characteristics of the used light source and optical system are constant, shadows and unevenness generated in the brightness are also constant and, therefore, can easily be corrected. Accordingly, high quality images can be output and digital images can be binarized easily and at high quality.

On the other hand, in recent years, with the rise in popularity of video cameras and digital cameras, there has been an increasing demand to be able to recognize written characters in images input from these types of devices. With regard to digital cameras, in particular, as the number of pixels have increased markedly and their size reduced, they have begun to be used in various applications as portable information acquisition tools. For example, character information such as documents, notice boards, and advertisements provide sufficient information as binary images and, moreover, the amount of storage space required to save this information is less than multi-valued images so that it is advantageous to save the information as a binarized image. Furthermore, binarized images can be transmitted using a facsimile or reused after undergoing a character recognition process.

Japanese Patent Application Laid-Open No. 3-237571 "Device For Calculating Binarized Threshold of Image" discloses a technology of suitably binarizing these types of digital images. According to this technology a high quality binarized image is obtained by providing a binarization circuit which performs binarization processing on an image in a window by comparing the difference between the brightness of each pixel in the window and the brightness of a specific pixel with a parameter which is proportional to the contrast of the observed image portion and by providing a determining circuit which determines the suitability of the binary pattern obtained by the binarization circuit as an image pattern of a contour portion.

Japanese Patent Application Laid-Open No. 7-212591 "Image Binarizing Device" also discloses a technology of binarization. According to this technology a histogram of luminance values is generated from a multi-valued image and the white pixel representative values and the black pixel representative values determined from the histogram. A binarization threshold value is then determined from the mean thereof, and the multi-valued image is binarized on the basis of the binarization threshold value. This patent application also discloses a technology in which an image is divided into blocks, the binarization threshold value or white pixel representative value/black pixel representative value for each block is determined, blocks with no characters therein are interpolated from surrounding blocks, and block threshold values are adopted as the threshold values for each pixel, thereby allowing brightness unevenness and shadows in the image to be removed. Thus, high quality binarization can be performed using the technology disclosed in this patent application.

However, the problems described below exist in the conventional technology. Namely, the number, position, and strength of the light sources are different, and therefore shadows and brightness unevenness easily occur in the photographed image. Moreover, because the shadows and brightness unevenness are inconstant, it is not possible to apply uniform correction as with the scanner section of a photocopier machine or the like. Accordingly, images photographed using a digital camera have the problem that high quality binarization is not possible.

Moreover, even if images have been photographed using a homogeneous light source, peripheral light reduction is caused by the properties of the optical system resulting in the problem arising that uniform correction and high quality binarization are not achievable.

Furthermore, for example, on a notice board, some characters or a group of characters are of small size. If such a notice board is photographed then there is a need to perform partial high quality binarization.

In Japanese Patent Application Laid-Open No. 3-237571 "Device For Calculating Binarized Threshold of Image", it is required to provide the binarization circuit for performing image processing on each pixel in a window, and the determination circuit for performing pattern matching on the contour portions as an image pattern. Accordingly, there is the problem that the processing load has substantial increased and the processing speed has consequently decreased.

Moreover, in Japanese Patent Application Laid-Open No. 7-212591 "Image Binarizing Device", in addition to generating a luminance value histogram for all the pixels, it is necessary to determine the white and black pixel representative values using loop processing and perform edge enhancement processing to enhance the edges of characters and diagrams. Accordingly, there is the problems that considerable processing resources are required and the rate of power consumption is also high.

SUMMARY OF THE INVENTION

It is one object of this invention to perform high quality binarization on a multi-valued image.

It is an another object of the present invention to perform high quality binarization of a multi-valued image rapidly and at a low rate of power consumption.

In order to achieve the above object, the image binarization apparatus according to one aspect of the present invention removes the low luminance values from an object block on the basis of mean luminance values of the surrounding blocks, and sets the binarization threshold value of the object block on the basis of the mean of the luminance values from which the low luminance values have been removed.

The image binarization apparatus according to another aspect of the present invention removes the low luminance values on the basis of the mean luminance values of surrounding blocks, sets the binarization threshold values of object blocks on the basis of the mean of the luminance values from which the low luminance values have been removed, and sets the binarization threshold values to be applied to each pixel of interpolation blocks on the basis of the binarization threshold values of adjacent object blocks.

The image binarization apparatus according to still another aspect of the present invention removes the low luminance values of object blocks on the basis of the mean luminance values of surrounding blocks, and rounds the mean of the luminance values from which the low luminance values have been removed to values within a predetermined range. These values then become the basis on which the binarization threshold values of the object blocks are set.

The image binarization apparatus according to still another aspect of the present invention removes the low luminance values of object blocks on the basis of the mean luminance values of surrounding blocks, and rounds the mean of the luminance values from which the low luminance values have been removed to values within a predetermined range. These values then become the basis on which the binarization threshold values of the object blocks are set. The binarization threshold values applied to each pixel of the interpolation blocks are set on the basis of binarization threshold values of adjacent object blocks.

The image pickup apparatus according to still another aspect of the present invention sets the binarization threshold values of created blocks are set on the basis of smoothed photometric values of created screens.

The image pickup apparatus according to still another aspect of the present invention sets the binarization threshold values applied to each pixel of an interpolation block on the basis of smoothed photometric values of adjacent created screens.

The image pickup apparatus according to still another aspect of the present invention rounds the photometric values of created screens to values within a predetermined range, and sets the binarization threshold values of created blocks based on these values.

The image pickup apparatus according to still another aspect of the present invention rounds the photometric values of adjacent created screens to values within a predetermined range and sets the binarization threshold values applied to each pixel within an interpolation block based on these values.

The image binarization method according to still another aspect of the present invention removes the low luminance values of the object blocks on the basis of the mean luminance values of surrounding blocks. The binarization threshold values of the object blocks are then set on the basis of the mean of luminance values from which the low luminance values have been removed.

The image binarization method according to still another aspect of the present invention removes the low luminance values of the object blocks on the basis of the mean luminance values of surrounding blocks. The binarization threshold values of the object blocks are then set on the basis of the mean of the luminance values from which the low luminance values have been removed. Binarization threshold values to be applied to each pixel of the interpolation block are then set based on the binarization threshold values of adjacent object blocks.

The image binarization method according to still another aspect of the present invention removes the low luminance values on the basis of the mean luminance values of surrounding blocks. The means of the luminance values from which the low luminance values have been removed are then rounded to values within a predetermined range and the binarization threshold values of the object blocks are then set on the basis of these values.

The image binarization method according to still another aspect of the present invention removes the low luminance values on the basis of the mean luminance values of surrounding blocks. The means of the luminance values from which the low luminance values have been removed are then rounded to values within a predetermined range and the binarization threshold values of the object blocks are then set on the basis of these values. The binarization threshold values applied to each pixel of the interpolation blocks are then set on the basis of the binarization threshold values of adjacent object blocks.

The image pickup method according to still another aspect of the present invention set the binarization threshold values of created blocks on the basis of smoothed photometric values of a created screen.

The image pickup method according to still another aspect of the present invention sets the binarization threshold values applied to each pixel of an interpolation block on the basis of smoothed photometric values of adjacent created screens.

The image pickup method according to still another aspect of the present invention rounds the photometric values of created screens to values within a predetermined range, and sets the binarization threshold values of created blocks on the basis of these values.

The image pickup method according to still another aspect of the present invention rounds the photometric values of adjacent created screens to values within a predetermined range, and sets the binarization threshold values applied to each pixel of the interpolation blocks on the basis of these values.

According to still another aspect of the present invention there is provided a computer readable recording medium on which a program for enabling a computer to perform the functions of each step of the image binarization method and the image pickup method described above is recorded.

Other objects and features of this invention will become apparent from the following description with reference to the accompanying drawings.

BRIEF DESCRIPTION OF THE DRAWINGS

FIG. 2 is a conceptual view of a light receiving section of a CCD in a digital camera of the first embodiment.

FIG. 4A and FIG. 4B show examples of sampling intervals for sampling pixels inside a block.

DESCRIPTION OF THE PREFERRED EMBODIMENTS

The present invention will now be described below in detail with reference to the drawings.

Figure 1:
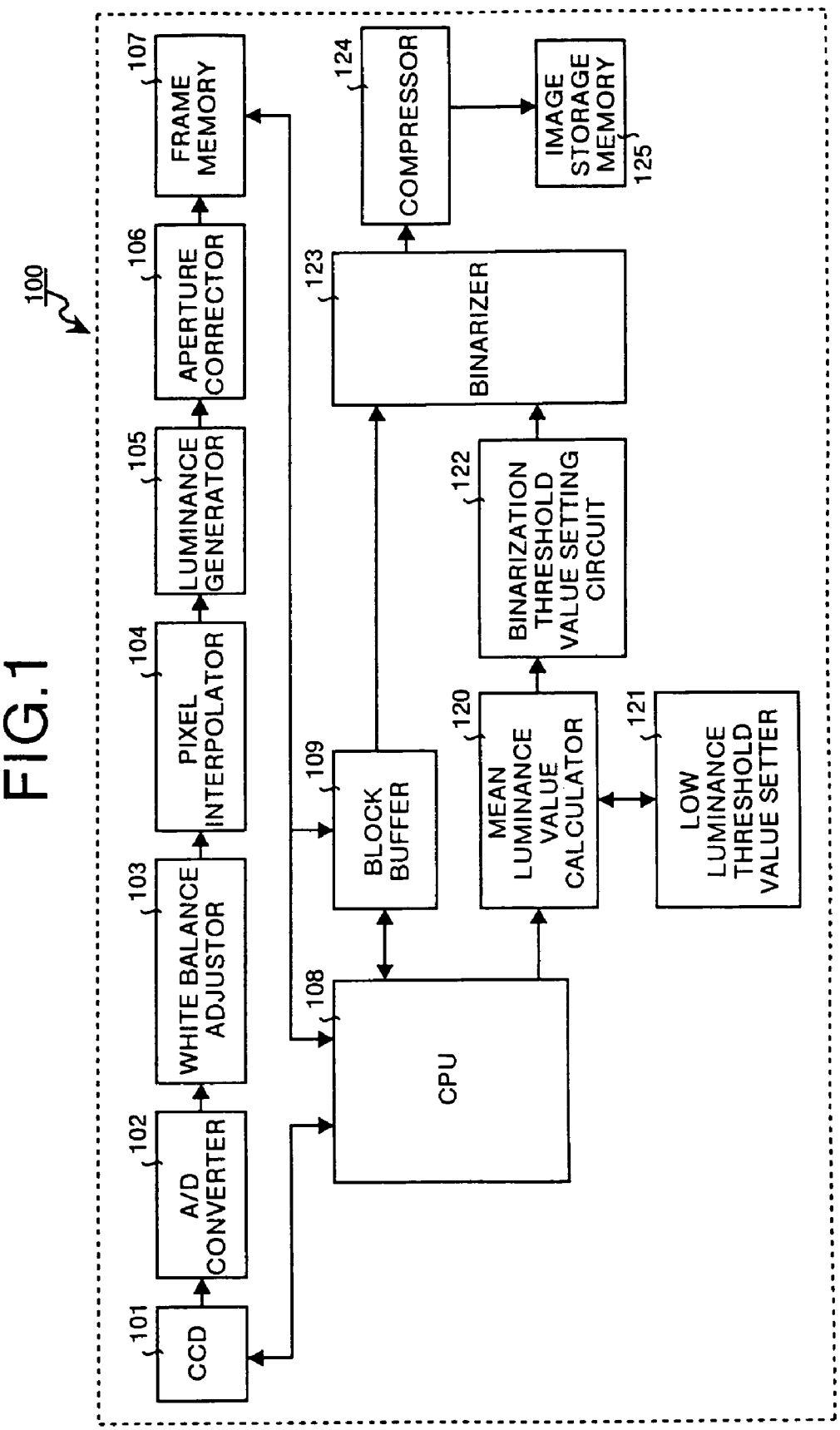
FIG. 1 is a block diagram showing an example of a structure of an image binarization apparatus of the first embodiment of the present invention when it is used in a digital camera.

The first embodiment explained below relates to an image binarization apparatus of the present invention which is used in a digital camera. FIG. 1 is a block diagram showing an example of the apparatus structure from the input of image data until a binarized image (binarized data) is recorded when an image binarization apparatus of the present invention is used in a digital camera.

A digital camera 100 comprises a CCD 101, an A/D converter 102, a white balance adjustor 103, a pixel interpolator 104, a luminance generator 105, an aperture corrector 106, frame memory 107, a CPU 108, a block buffer 109, a mean luminance value calculator 120, a low luminance threshold value setter 121, a binarization threshold value setting circuit 122, a binarizer 123, a compressor 124, and an image storage memory 125.

The CCD 101 converts light converged by a not shown optical system of the digital camera 100 into electric signals and outputs R, G, B analog signals for each pixel forming a multi-valued image as image data. The output analog signals are converted into digital signals by the A/D converter 102. The white balance of the digital signals is adjusted by the white balance adjustor 103. In the pixel interpolator 104, interpolation of R, G, or B signals for which no information exists is performed in each pixel on the image data after the white balance thereof has been adjusted. Thereafter, R, G, and B are taken as representing red, green, and blue, or alternatively, a red signal value, a green signal value, or a blue signal value.

The relationship between the filter of the CCD 101 and the interpolation by the pixel interpolator 104 will now be described. FIG. 2 is a conceptual view of a light receiving section of the CCD 101. R, G, and B filters are set in a fixed pattern in the light receiving section and color differences are identified by these filters. Note that it is normal to provide more filters for green pixels to which the human eye is highly sensitive than for other colors. The suffixes are used as identifiers for identifying position (filter number) Note also that filter numbers are only provided for the central portion of the figure.

A red R interpolation signal value R(G0) and a blue B interpolation signal value B(G0) at the position G0 are calculated using the following equation (1):

$$R(G0)=(R0+R2)/2$$

$$B(G0)=(B0+B1)/2 \quad (1)$$

Green G interpolation signal values G(R0), B(R0), G(B0), and R(B0) at the positions R0 and B0 are calculated using the following equation (2):

$$G(R0)=(G0+G1+G2+G5)/4$$

$$B(R0)=(B0+B1+B4+B5)/4$$

$$G(B0)=(G0+G1+G3+G6)/4$$

$$R(B0)=(R0+R2+R4+R5)/4 \quad (2)$$

The pixel interpolator 104 performs the interpolation expressed above at each pixel position and outputs interpolated R, G, B signals for each pixel.

The luminance generator 105 generates a luminance signal value Y from each of the interpolated pixels using the following equation (3):

$$Y=0.34\,R+0.55\,G+0.11\,B \quad (3)$$

A multiplier and an adder are necessary to calculate the luminance signal values, which are digital values, using the equation (3). However, by approximating the equation (3) using the following equation (4), it is possible to construct the luminance generator 105 with only an adder.

$$Y=(2/8)R+(5/8)G+(1/8)B \quad (4)$$

As a result, when this equation (4) is used to calculate the luminance signal values, it is possible to calculate the luminance value Y with a simple circuit structure. Accordingly, it is possible to provide a digital camera with low circuit cost and superb calculation speed and power consumption.

High pass portions of the image data of the luminance signal value Y are enhanced by the aperture corrector 106. The aperture correction is performed using a common 5×5 size high pass enhancement filter. After high pass enhancement, the luminance value signals are stored temporarily in the frame memory 107.

The CPU 108 calculates the block size and sampling interval (sampling cycle). The block buffer 109 described below, the mean luminance value calculator 120, and other circuits and members of the digital camera 100 are also controlled by the CPU 108. Because the image size of the multi-valued image is determined by the size of the CCD (i.e. by the number of pixels), the CPU 108 calculates the necessary block size and sampling interval (sampling cycle) to binarize the multi-valued image based on the image size.

Unevenness in the luminance values caused by the optical system of the digital camera 100 (for example, the lens) differ depending on the position and strength of the light source, however, as a rule, the center region of an image is bright while the image tends to get darker the closer to the edges thereof. Accordingly, the CPU 108 calculates the image division pattern taking into consideration peripheral light reduction of the optical system. Note that a division pattern may be selected from a fixed block division pattern set in a not shown storage section or the like.

Figure 3A:
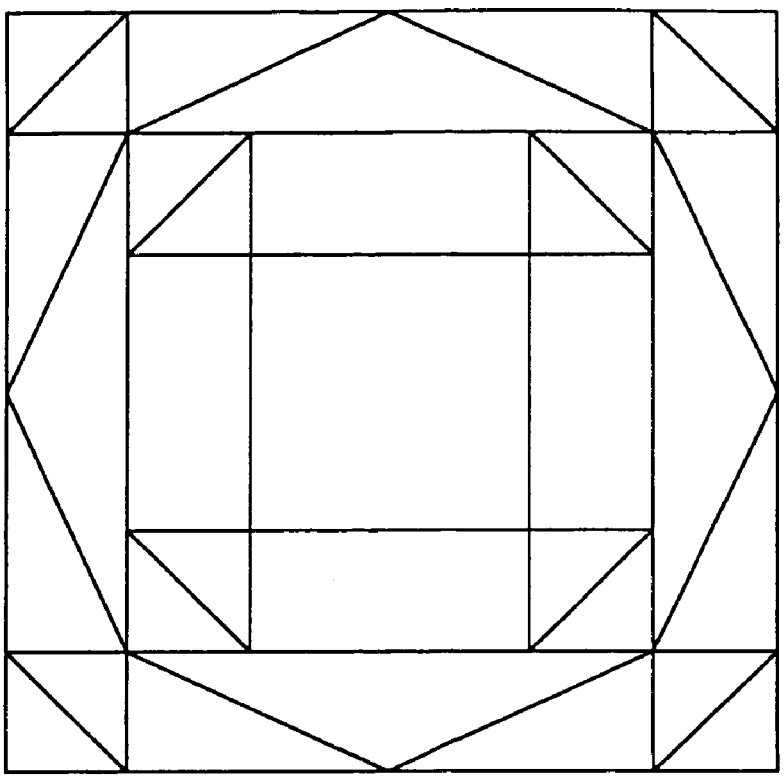
FIG. 3A and FIG. 3B show examples of divisions of multi-valued images photographed using a digital camera of the first embodiment into blocks.
Figure 3B:
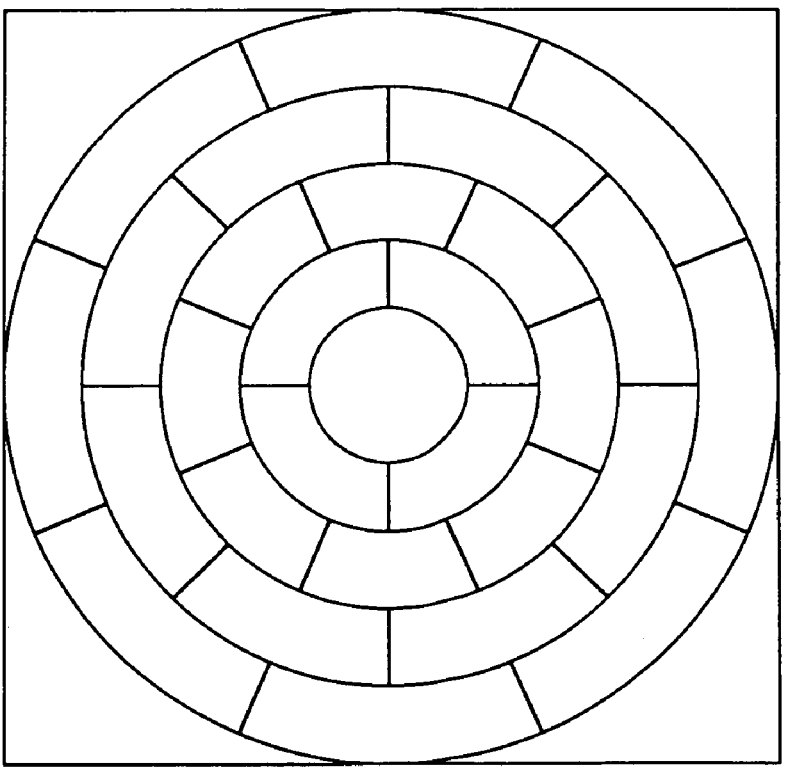

FIG. 3A and FIG. 3B show examples of divisions of multi-valued images into blocks. In addition to a normal division into rectangular shapes, FIG. 3A shows an example where a multi-valued image is divided into a combination of squares, rectangles, and triangles point-symmetrically around the center of the image (the lens center). In contrast, FIG. 3B shows an example where a multi-valued image is divided on the basis of concentric circles around the center of the image. By dividing the image into blocks with due consideration given to the optical system, the brightness of each block can be made more uniform. Moreover, because binarization threshold values are set for block units, as is described below, high image quality binarization of a multi-valued image becomes possible. Note that, in the description given below, the image is divided into square shaped blocks to make the description simpler.

The block buffer 109 reads from the frame memory 107 an image in the block units of the block division pattern determined by the CPU 108 and temporarily stores the image. Note that blocks stored in the block buffer 109 are referred to as object blocks (i.e. these blocks are the object of subsequent processing).

The mean luminance value calculator 120 samples pixels from images stored in the block buffer 109 at a predetermined sampling cycle and calculates the mean luminance value. FIG. 4A and FIG. 4B show examples of sampling intervals at which the pixels in the blocks are sampled. FIG. 4A shows a state when the size of the image is 1280 pixels by 960 pixels and the CPU 108 sets the block size at 64 pixels by 64 pixels and the sampling cycle at 2 (FIG. 4A only shows a group of 9 pixels by 8 pixels of a block). In contrast, FIG. 4B shows a state when the size of the image is 2560 pixels by 1920 pixels and the CPU 108 sets the block size at 128 pixels by 128 pixels and the sampling cycle at 4 (FIG. 4B only shows a group of 9 pixels by 8 pixels of a block).

In accordance with processing performance while considering power consumption, it is also possible for the CPU 108 to set as fixed a total number of blocks for the size of the image to be binarized or a sampling interval within a block. Accordingly, even if the size of the image is larger (i.e. even if the total number of pixels is greater), the sampling number can be fixed and the processing time until the binarization threshold is determined can be shortened. Consequently, binarization processing with low power consumption is possible. Note that the CPU 108 may set the sampling interval at units of one block.

Figure 5:
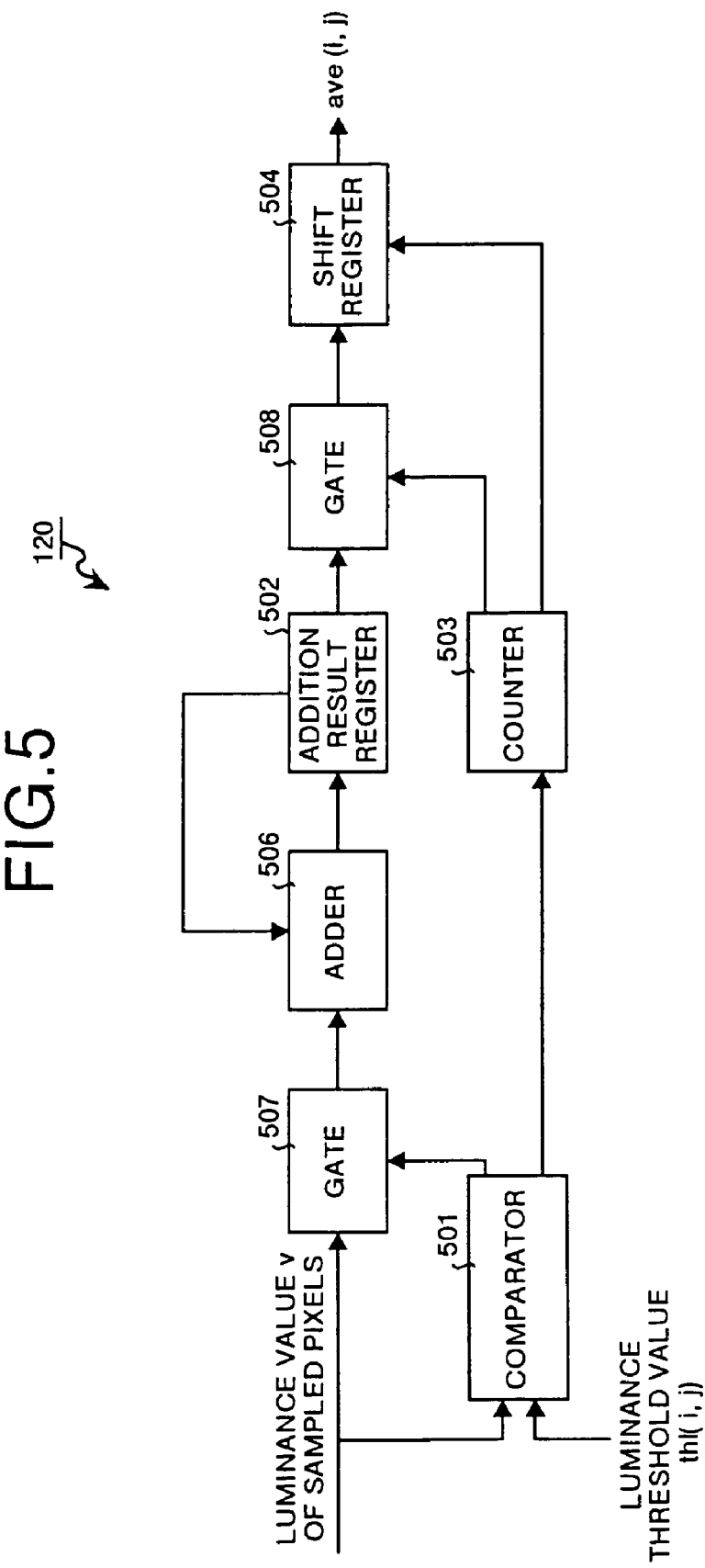
FIG. 5 is a block diagram showing an example of a structure of a mean luminance value calculator of a digital camera of the first embodiment.

FIG. 5 is a block diagram showing an example of the structure of the mean luminance value calculator 120. The luminance value (here set at v) of the pixels sampled by the CPU 108 is compared with a low luminance threshold value (here set at thl(i, j) (thl(i, j) is an index representing the block number and this block is set as B(i, j))) by a comparator 501. When the luminance value v of the sampled pixels is greater than the low luminance threshold value thl(i, j), the comparator 501 outputs a signal value of 1 and when the luminance value v of the sampled pixels is less than the low luminance threshold value thl(i, j), the comparator 501 outputs a signal value of 0.

If a signal value of 1 is output, a gate 507 is opened and the luminance value v is input into the adder 506. The adder 506 adds a value of an addition result register 502 (referred to hereafter as sumv) to the input luminance value v of the pixels and the addition result register 502 stores the new addition result. The signal value of 1 from the comparator 501 is also transmitted to a counter 503 which counts the number of luminance values v (referred to hereafter as num) to have passed through the gate 507.

The above processing can be expressed as an algorithm in a mathematical equation by the following equation (5).

$$\text{if } v > \text{thl}(i, j)$$
$$\text{then sum}v = \text{sum}v + v$$
$$\text{num} = \text{num} + 1$$
$$\text{else sum}v = \text{sum}v$$
$$\text{num} = \text{num} \quad (5)$$

If, as a result of the increment, the counter 503 is placed in a state where the number of digits is steadily increasing (i.e. in a state where the counter expresses a power of two), the gate 508 is opened and the sum of the luminance values v (sumv) held in the addition result register 502 is transmitted to a shift register 504. A bit position beginning with a 1 in the counter 503 is shifted to the right by an amount of −1. After processing has been completed for all pixels in a block, the value stored in the shift register 504 is output as a mean luminance value ave(i, j). Namely, the mean luminance value is calculated with the following equation (6):

$$\text{ave}(i, j) = \text{sum}v'/\text{num}' \quad (6)$$

Here, num' is a numerical value less than the sample number sampled in the block B(i, j) and represents the greatest value of a number expressed as a power of two. While sumv' represents the value held in the addition result register 502 when the num' is counted.

The low luminance threshold value setter 121 multiplies a predetermined coefficient by the mean luminance value ave (i−1, j) of the previous adjacent block (i.e. if the current block is B(i, j), then the previous adjacent block is B(i−1, j)) and calculates the low luminance threshold value thl(i, j) to be used in the mean luminance value calculator 120. If the predetermined coefficient is taken as Ca=¼ (1/the power of 2), then the low luminance value threshold setter 121 becomes a value from which lower order 2 bits of the ave(i, j) are removed and, consequently, no special circuitry is required and the circuit structure can be simplified. Moreover, high speed processing at a low level of power consumption becomes possible. The calculation described above can be represented by the following equation (7):

$$\text{thl}(i, j) = \text{ave}(i-1, j) \times Ca \quad (7)$$

In this case, the mean luminance value ave of only one adjacent block was used when the low luminance threshold value thl was calculated, however, depending on the type of block division, it is also possible to use the mean luminance values ave of all adjacent blocks (for example, those blocks above, below, to the left and to the right).

The binarization threshold value setting circuit 122 uses the mean luminance value ave(i, j) calculated by the mean luminance value calculator 120 to set a binarization threshold value TH(i, j) to be used for binarizing a multi-valued image. The binarization threshold value TH(i, j) is set by multiplying the mean luminance value ave(i, j) by, for example, a predetermined coefficient Cb. However, in the same way as with the low luminance threshold value setting circuit 121, if Cb is set as x/16 or Cb is set as x/8 (where x is a predefined value representing a natural number no greater than the denominator), then the binarization threshold value setting circuit 122 can be structured using only an adder. Accordingly, the circuit structure can be simplified and high speed processing at a low level of power consumption becomes possible. If the above is represented as a mathematical equation, the following equation (8) is obtained:

$$TH(i, j) = \text{ave}(i, j) \times Cb \quad (8)$$

The binarizer 123 compares each pixel of the block buffer 109 with the binarization threshold value TH and performs binarization. The binarized image undergoes image compression appropriate to a binary image such as MH or MR in the compressor 124. The compressed image is then stored in the image storage memory 125.

In the above description, the CPU 108 corresponds to the block division unit and sampling unit; the CCD 101, the A/D converter 102, the white balance adjuster 103, the pixel interpolator 104, the luminance generator 105, and the aperture corrector 106 correspond to the luminance value output unit; the binarization threshold value setting circuit 122 corresponds to the binarization threshold value setting unit; the binarizer 123 corresponds to the binarization unit; the low luminance threshold value setter 121 corresponds to the low luminance threshold value setting unit; the frame memory 107, the block buffer 109, and the CPU 108 correspond to the object block selection unit; the comparator 501 corresponds to the low luminance value removal unit, and the mean luminance value calculator 120 corresponds to the mean luminance value calculation unit.

Figure 6:
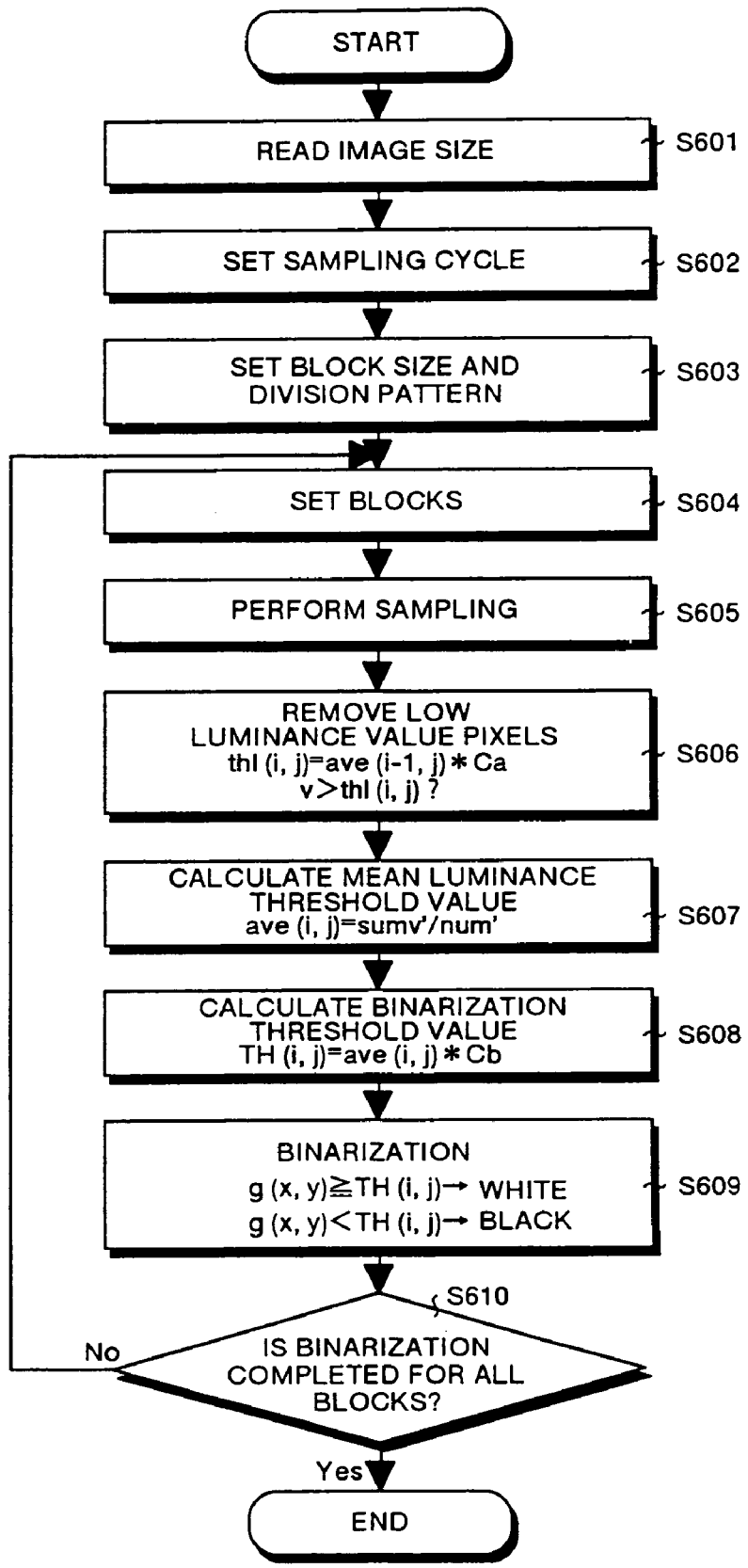
FIG. 6 is a flow chart showing the flow of image data processing as far as the binarization of a multi-valued image in a digital camera of the first embodiment.

Next, the flow of the processing as far as the binarization of a multi-valued image is described. FIG. 6 is a flow chart showing the flow of image data processing until a multi-valued image is binarized. The CPU 108 reads the size of a multi-valued image stored in the frame memory 107 (step S601). Note that it is also possible to use information from a preset number of pixels in the digital camera 100 or from the CCD 101 or the like, instead of from the frame memory 107. Next, in accordance with the image size, the CPU 108 sets the sampling cycle (step S602).

On the basis of the image size read in step S601 and the sampling cycle set in step S602, the CPU 108 sets the block size, shape, and division pattern (step S603). Because the number of pixels output by the CCD 101 remains fixed or is a rated pixel number such as 640×480 pixels or 800×600 pixels specified by switching mode, it is also possible for the CPU 108 to select a predetermined sampling cycle and block shape.

Next, a single block B(i, j) is set from the plurality of created blocks and image information is transferred to the block buffer 109 (step S604). Pixels (luminance values) are then sampled from the block B(i, j) in accordance with the sampling cycle set in step S602 (step S605). Next, on the basis of the mean luminance value ave(i−1, j) of the adjacent block B(i−1, j) calculated in a previous routine, a low luminance threshold value thl(i, j) for the block B(i, j) is calculated and luminance values which do not reach the low luminance threshold value thl(i, j) are then removed from luminance values of the sampled pixels (step S606). Removing the low luminance pixels in step S606 aids high quality binarization processing.

Using the luminance values from which the low luminance values have been removed, the mean luminance value ave(i, j) of the block B(i, j) is calculated (step S607). The binarization threshold value TH(i, j) for the block B(i, j) is then calculated on the basis of the mean luminance value ave(i, j) (step S608). The binarization threshold value TH(i, j) is then used to binarize all the pixels (taken as g(x, y)) of the block B(i, j) stored in the block buffer 109 (step S609). Note that x and y are natural numbers representing the position of each pixel inside the block.

Lastly, a determination is made as to whether or not the binarization processing has been completed for all blocks (step S610). When all the blocks have been binarized (i.e. the result of determination in step S610 is YES), the processing is ended. If not all the blocks have been binarized (i.e. the result of determination instep S610 is NO), a block adjacent to the block B(i, j) (for example, the block B(i+1, j)) is set and steps S604 to S610 are repeated.

In the first embodiment, an example was described when the image binarization apparatus of the present invention was used in a digital camera. Block division is performed to correspond to the image size and the optical system and samples of the luminance values are extracted from the blocks. Because of this and because a low luminance binarization threshold value is set in consideration of the surrounding blocks and binarization is performed based on this, even if all the pixels inside a block are part of a large character, or if the brightness between blocks abruptly changes, it is possible to calculate an appropriate mean luminance value and to perform high quality, rapid binarization of an image at a low level of power consumption. This, in turn, enables the useable duration of the digital camera battery to be lengthened.

Figure 7:
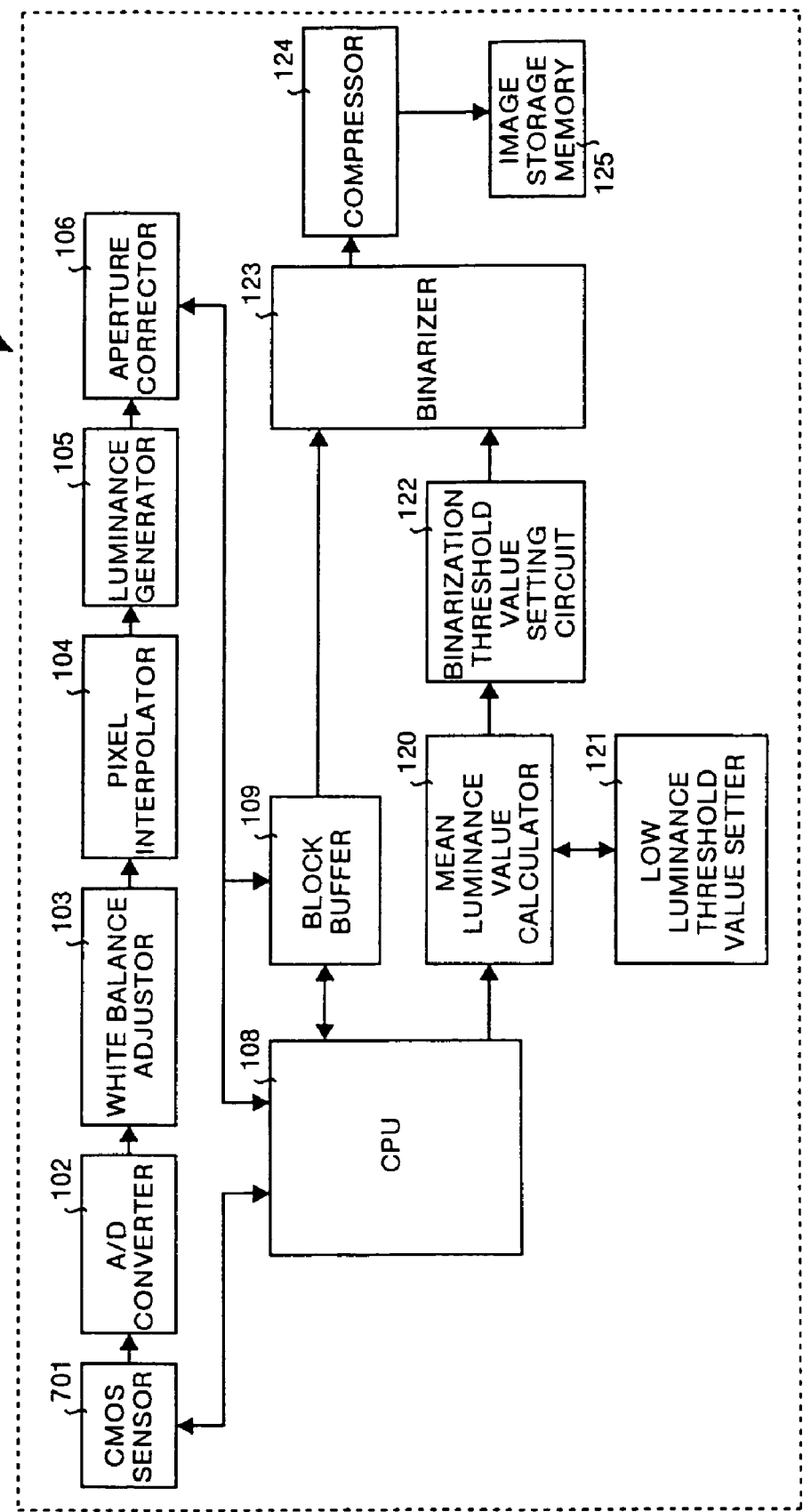
FIG. 7 is a block diagram showing an example of the apparatus structure when an image binarization apparatus of the second embodiment of the present invention is used in a digital camera.

The second embodiment explained below relates to an image binarization apparatus of the present invention which is used in a digital camera. FIG. 7 is a block diagram showing an example of the apparatus structure from image input until a binarized image is recorded in a digital camera using a CMOS sensor in the image input section. Note that, in the present embodiment, structural sections identical to those in the first embodiment are given the same symbols and a detailed description thereof is omitted. Here, mainly those sections different to those of the first embodiment are described.

The digital camera 700 is provided with a CMOS sensor 701 in the image input section. As a result, unlike the CCD 101 (see FIG. 1) which can only perform raster scanning, the CMOS sensor 701 is capable of random access and cam perform reading in block units. Therefore, the frame memory 107 is not required and the circuit structure can be simplified. Furthermore, unlike the CCD 101 which requires a separate power source to the CMOS integrated circuits which form the other circuits of the digital camera 700, the CMOS sensor 701 uses the same power source as the CMOS integrated circuits, thus reducing power consumption. Consequently, because the size of the circuitry making up the digital camera 700 is also reduced, it is far more convenient than a system using a CCD in terms of power consumption, processing speed, and cost. Note that a CMOS sensor is used in the present embodiment, however, another image binarization apparatus having a block accessible image input section may also be used.

Figure 8:
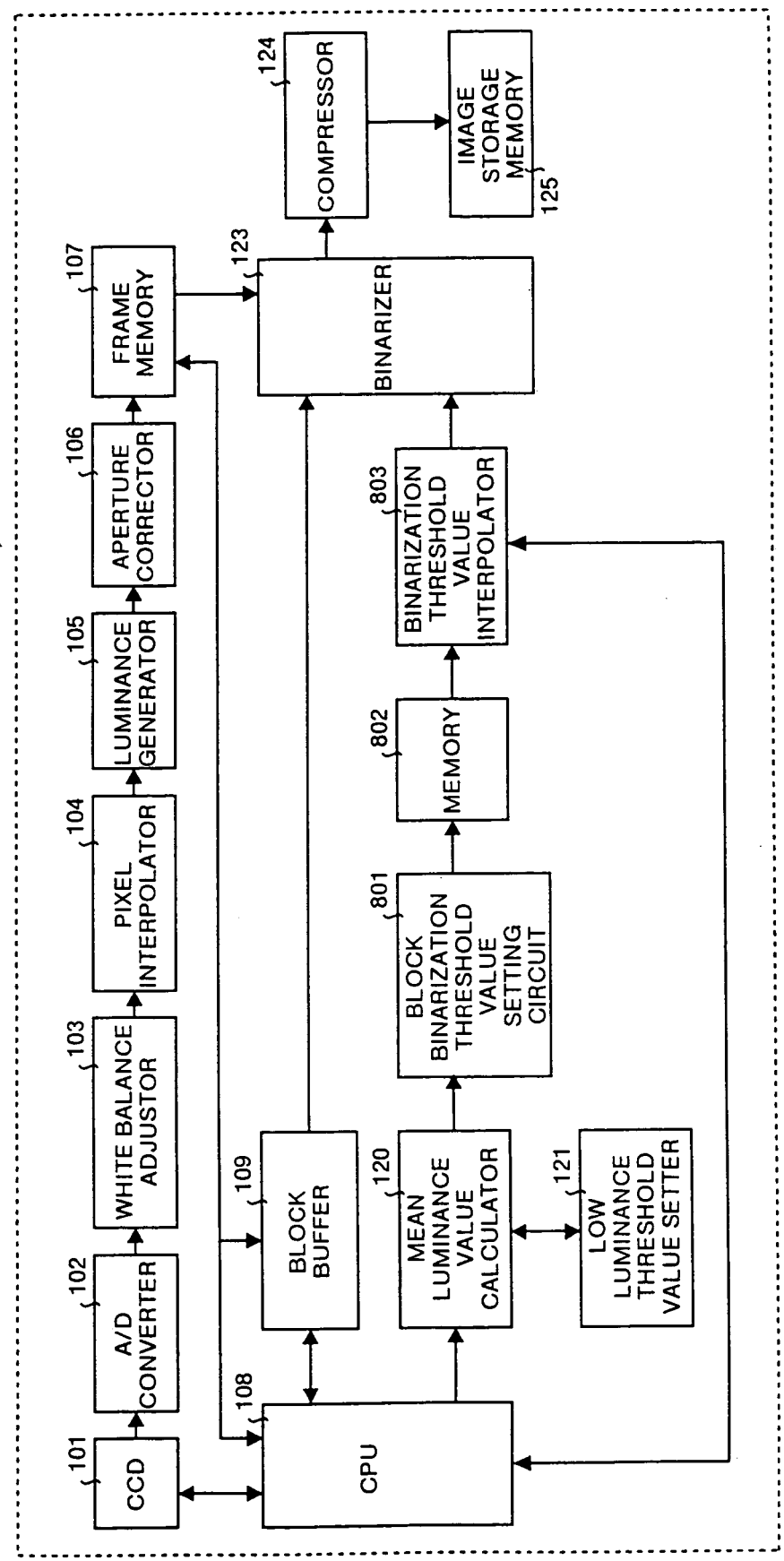
FIG. 8 is a block diagram showing an example of the apparatus structure when an image binarization apparatus of the third embodiment of the present invention is used in a digital camera.

In this third embodiment, a description is given of when a image binarization apparatus which calculates binarization threshold values to be applied to each pixel in a predetermined block and binarizes the image data for each pixel is used in a digital camera. FIG. 8 is a block diagram showing an example of the apparatus structure of a digital camera which calculates binarization threshold values to be applied to each pixel and binarizes the image data for each pixel. Note that, in the present embodiment, structural sections identical to those in the first embodiment are given the same symbols and a detailed description thereof is omitted. Here, mainly those sections different to those of the first embodiment are described.

The digital camera 800 is provided with a block binarization threshold value setting circuit 801 into which are input mean luminance values output from the mean luminance value calculator 120 and which outputs binarization threshold values to be applied to each block (these are referred to below as block binarization threshold values); memory 802 for storing the block binarization threshold values; and a binarization threshold value interpolator 803 which sets binarization threshold values to be applied to each individual pixel in a predetermined block on the basis of the block binarization threshold values. Other than these, the structure is the same as that of the digital camera 100 of the first embodiment. Note that a section for generating color difference signals is omitted.

The block binarization threshold value setting circuit 801 is identical to the binarization threshold value setting circuit 122 of the digital camera 100 (see FIG. 1) and outputs block binarization threshold values of object blocks for storage in the memory 802. The block binarization threshold value setting circuit 801 calculates block binarization threshold values for all the blocks to be stored sequentially in the memory 802.

Figure 9A:
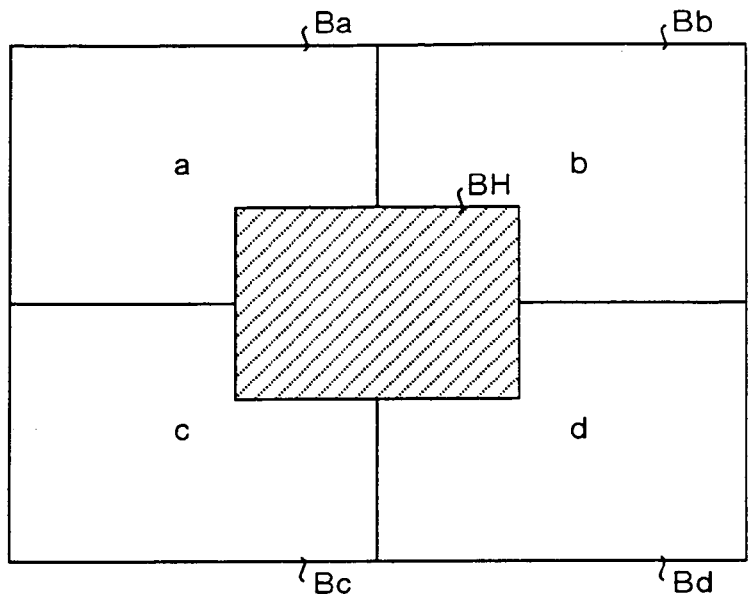
FIG. 9A and FIG. 9B are explanatory diagrams summarizing the calculation of binarization threshold values applied to each pixel within an interpolation block of a digital camera of the third embodiment.
Figure 9B:
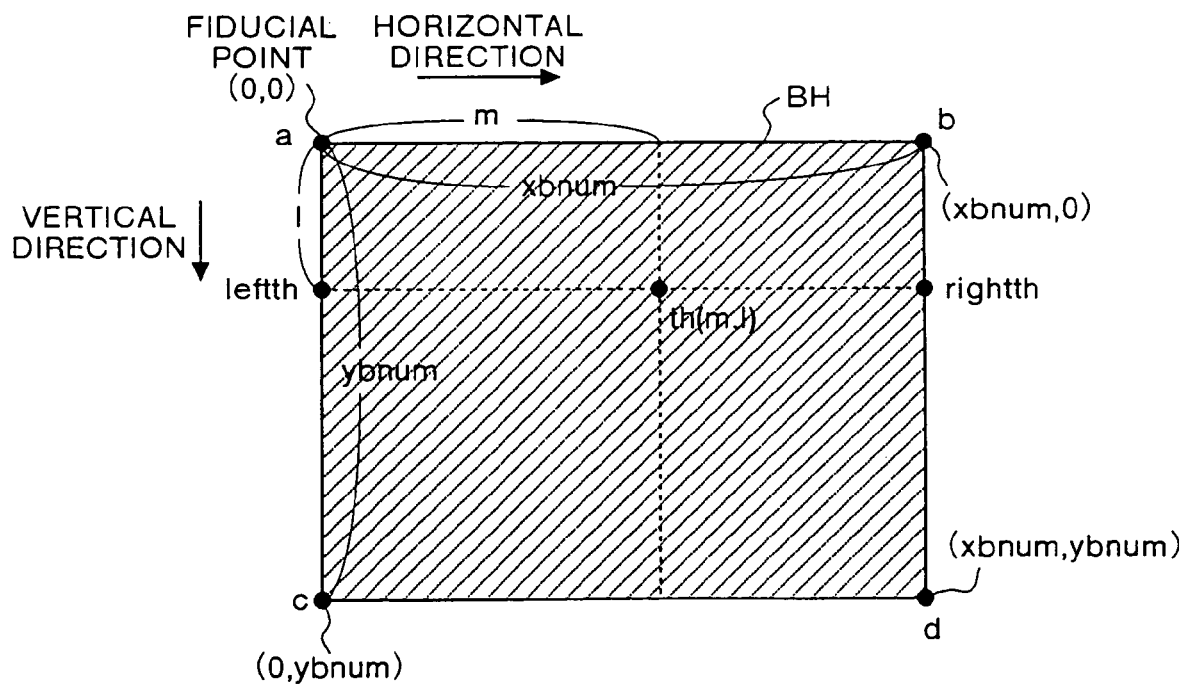

The binarization threshold value interpolator 803 uses the block binarization threshold values of all the blocks stored in the memory 802 to set binarization threshold values to be applied to each pixel in a predetermined area. Note that, in the description given below, the term interpolation block refers to a predetermined area for each of whose constituent pixels a binarization threshold value is set. A description will now be given of the outline of the calculation of the binarization threshold values to be applied to each pixel in an interpolation block. FIG. 9A and FIG. 9B are explanatory diagrams summarizing the calculation of binarization threshold values applied to each pixel within an interpolation block. FIG. 9A shows the relationship between object blocks and an interpolation block, and FIG. 9B shows the calculation of the binarization threshold value to be applied to each pixel within an interpolation block.

As is clearly shown in FIG. 9A, the interpolation block BH bridges four adjacent object blocks Ba, Bb, Bc, and Bd. The binarization threshold values of the object blocks Ba, Bb, Bc, and Bd are set respectively as a, b, c, and d. The binarization threshold value interpolator 803 uses the block binarization threshold values a, b, c, and d to calculate binarization threshold values to be applied to each pixel within the interpolation block BH.

A description will now be given of the method of calculating binarization threshold values to be applied to each pixel bp inside the interpolation block BH, while referring to FIG. 9B. The shape of the interpolation block BH is taken as being a rectangle with the size (number of pixels) thereof set as xbnum in the horizontal direction and ybnum in the vertical direction. The position of the pixel bp is set as (m, 1). At this time, it may be considered that the value a is at the point (0, 0) of the interpolation block BH, the value b is at the point (xbnum, 0) of the interpolation block BH, the value c is at the point (0, ybnum) of the interpolation block BH, and the value d is at the point (xbnum, ybnum) of the interpolation block BH. The area between these points is linearly approximated.

Firstly, if the temporary threshold value on the boundary line at the left hand side of the interpolation block BH is taken as leftth, and the temporary threshold value on the boundary line at the right hand side of the interpolation block BH is taken as rightth, then the following equation (9) can be applied:

$$\text{leftth} = (a(\text{ybnum}-1) + c1)/\text{ybnum}$$

$$\text{rightth} = (b(\text{ybnum}-1) + d1)/\text{ybnum} \qquad (9)$$

Next, if it is taken that the point (0, 1) has the value leftth and the point (xbnum, 1) has the value rightth, then the binarization threshold value th(m, 1) to be applied to the pixels bp is linearly approximated using the following equation (10):

$$th(m, 1)=(leftth(xbnum-m)+rightth \times m)/xbnum \quad (10)$$

Note that when the interpolation block BH is at an edge of the overall image, there are only one or two adjacent object blocks. In this case, by substituting the obtained block binarization threshold values for the unavailable block binarization threshold values, equations (9) and (10) can be used. For example, at the top left edge of the image the only obtainable block binarization threshold value is d and the block binarization threshold values a, b, and c are not obtainable. Accordingly, in this case, the value d is substituted for a, b, and c.

In the binarizer 123, the luminance values of the pixels bp in the interpolation block obtained from the frame memory 107 or the block buffer 109 are compared with the binarization threshold values for the pixels bp calculated by the binarization threshold value interpolator 803 and binarization of the luminance values of the interpolation block BH is performed. Image compression appropriate for a binarized image such as MH or MMR is performed on the binarized image data using the compressor 124 in the same way as in the first embodiment.

Figure 10:
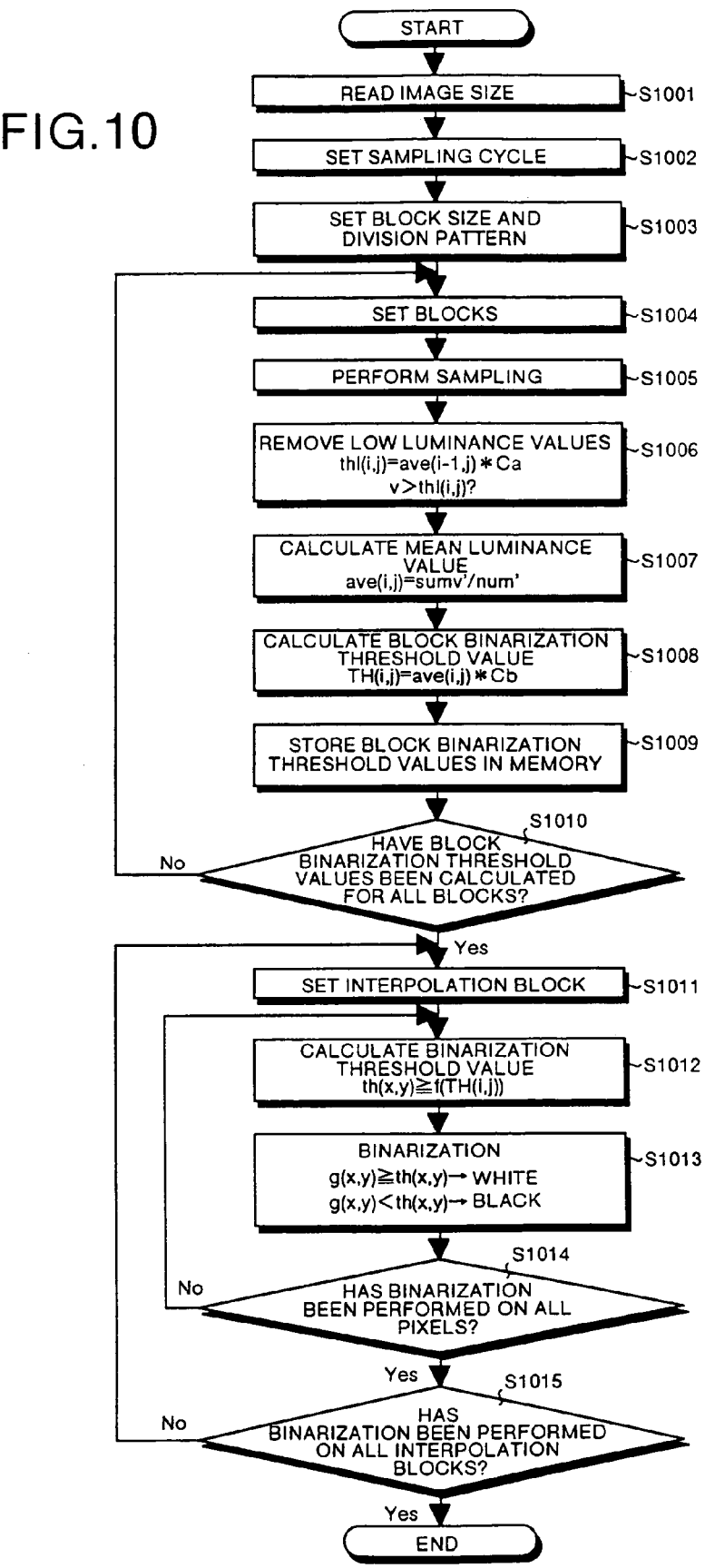
FIG. 10 is a flow chart showing the flow of image data processing as far as the binarization of a multi-valued image in a digital camera of the third embodiment.

Next, a description will be given of the processing flow until a multi-valued image is binarized in the present embodiment. FIG. 10 is a flow chart showing the flow of image data processing until the multi-valued image is binarized. The CPU 108 reads the size of the multi-valued image stored in the frame memory 107 (step S1001). Note that it is possible to use information from the CCD 101 or a pixel number preset in the digital camera 100 or the like instead of from the frame memory 107. Next, in accordance with the image size, the CPU 108 sets the sampling cycle (step S1002).

On the basis of the image size read in step S1001 and the sampling cycle set in step S1002, the CPU 108 sets the block size, shape, and division pattern (step S1003). Because the number of pixels output by the CCD 101 remains fixed or is a rated pixel number such as 640×480 pixels or 800×600 pixels specified by switching mode, it is also possible for the CPU 108 to select a predetermined sampling cycle and block shape.

Next, a single block B(i, j) is set from the plurality of blocks created and image information is transferred to the block buffer 109 (step S1004). Pixels (luminance values) are then sampled from the block B(i, j) in accordance with the sampling cycle set in step S1002 (step S1005). Next, on the basis of the mean luminance value ave(i−1, j) of the adjacent block B(i−1, j) calculated in a previous routine, the luminance threshold value thl(i, j) for the block B(i, j) is calculated. Luminance values which do not reach the low luminance threshold value thl(i, j) are then removed from luminance values of the sampled pixels (step S1006). Removing the low luminance pixels in step S1006 aids high quality binarization processing.

Using the luminance values from which the low luminance values have been removed, the mean luminance value ave(i, j) of the block B(i, j) is calculated (step S1007). The block binarization threshold value TH(i, j) for the block B(i, j) is then calculated on the basis of the mean luminance value ave (i, j) (step S1008). The calculated block binarization threshold value TH is then stored in the memory 802 (step S1009) A determination is then made as to whether or not the block binarization threshold values have been calculated for all blocks (step S1010). If the calculations have not been completed (i.e. if the result of determination in step S1010 is NO), a block adjacent to the block B(i, j) (for example, the block B(i+1, j)) is set and steps S1004 to S1010 are repeated.

When block binarization threshold values have been calculated for all the blocks (i.e. the result of determination in step S1010 is YES), an interpolation block is set (step S1011). This interpolation block is suitable for performing high quality partial binarization and the like and may be set in advance by the user or may be set by a suitable mode switching so as to comprise the central portion of the image. The binarization threshold value interpolator 803 uses the block binarization threshold values TH of the object blocks bridged by the interpolation block set in step S1011 to set the binarization threshold values th(x, y) of each single pixel inside the interpolation block (step S1012). Note that the coefficient f in FIG. 10 conceptually represents equations (9) and (10), while x and y are natural numbers representing the positions of each pixel in an image.

The pixels (taken here as g(x, y)) read from the frame memory 107 are binarized by the binarizer 123 using the binarization threshold values calculated in step S1011 (step S1013). Next, a determination is made as to whether or not binarization processing has been performed on all the pixels (step S1014). If binarization processing has not been performed on all the pixels (i.e. if the result of determination in step S1014 is NO), then the pixel adjacent to the pixel g (x, y) (for example, the pixel g(x+1, y)) is set and the steps S1012 to S1014 are repeated. If the determination is made that binarization processing has been completed for all the pixels (i.e. if the result of determination in step S1014 is YES), a determination is made as to whether or not binarization processing has been completed for all interpolation blocks (step S1015). If the binarization processing has not been completed (if the result of determination in step S1015 is NO), then steps S1011 to S1015 are repeated. When the binarization processing has been completed (when the result of determination in step S1015 is YES), the processing is ended.

In the third embodiment, block division is performed to correspond to the image size and the optical system and samples of the luminance values are extracted from the blocks. Because of this and because a low luminance binarization threshold value is set in consideration of the surrounding blocks and binarization is performed based on this, and, in addition, because binarization is performed by setting binarization threshold values to be applied to each pixel in an interpolation block using the above block binarization threshold values, high quality image processing using the digital camera of the first embodiment becomes possible. In particular, when photographing a notice board or the like, when all of the characters are small or when characters in a portion of the area are small, it is possible to perform partial high quality binarization in those locations.

Figure 11:
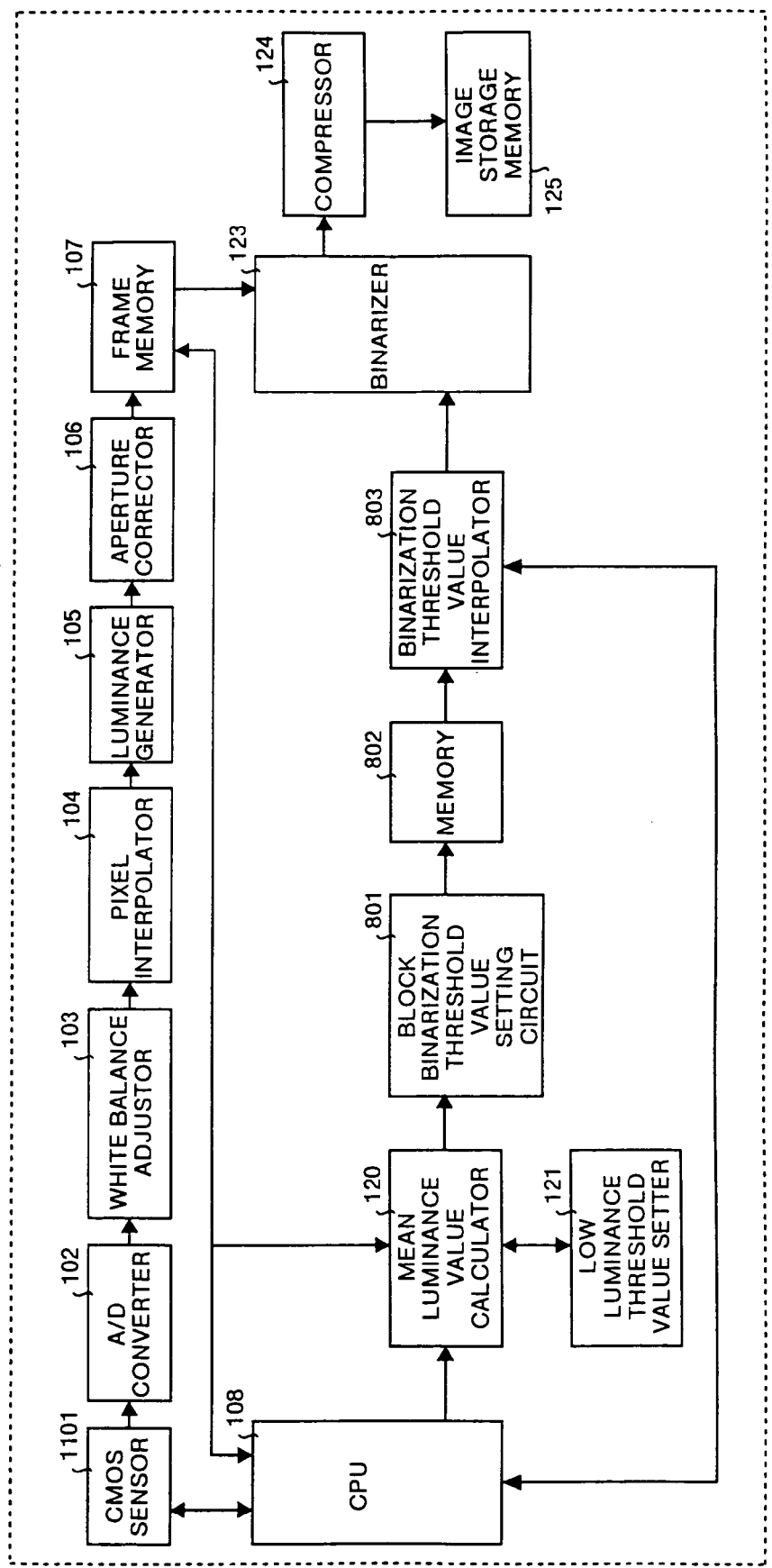
FIG. 11 is a block diagram showing an example of the apparatus structure of a digital camera in which binarization threshold values applied to each image pixel are calculated and image binarization is performed for each pixel using a CMOS sensor in the image input section.

The third embodiment explained below relates to an image binarization apparatus of the present invention which uses a CMOS sensor when calculating binarization threshold values to be applied to each pixel in a predetermined block and performing binarization of the image data for each pixel is used in a digital camera. FIG. 11 is a block diagram showing an example of the apparatus structure of a digital camera which uses a CMOS sensor in the image input section, calculates binarization threshold values to be applied to each pixel, and performs binarization of the image data for each pixel. Note that, in the present embodiment, structural sections identical to those in the third embodiment are given the same symbols and a detailed description thereof is omitted. Here, mainly those sections different to those of the third embodiment are described.

The digital camera 1100 is provided with a CMOS sensor 1101 in the image input section. As a result, unlike the CCD 101 (see FIG. 8) which can only perform raster scanning, the CMOS sensor 1101 is capable of random access, reading a block as a single unit, reading pixel values for each block, calculating block binarization threshold values, and storing data in the memory 802. Therefore, the block buffer 109 (see FIG. 8) is not required and the circuit structure can be simplified.

At the same time, the pixel values read per block are converted to luminance signals, undergo aperture correction, and are stored in the frame memory 107. Furthermore, unlike the CCD 101 which requires a separate power source to the CMOS integrated circuits which form the other circuits of the digital camera 800, the CMOS sensor 1101 uses the same power source as the CMOS integrated circuits, thus reducing power consumption. Consequently, because the size of the circuitry making up the digital camera 1100 is also reduced, it is far more convenient than a system using a CCD in terms of power consumption, processing speed, and cost. Note that a CMOS sensor is used in the present embodiment, however, another image binarization apparatus having a block accessible image input section may also be used.

Figure 12:
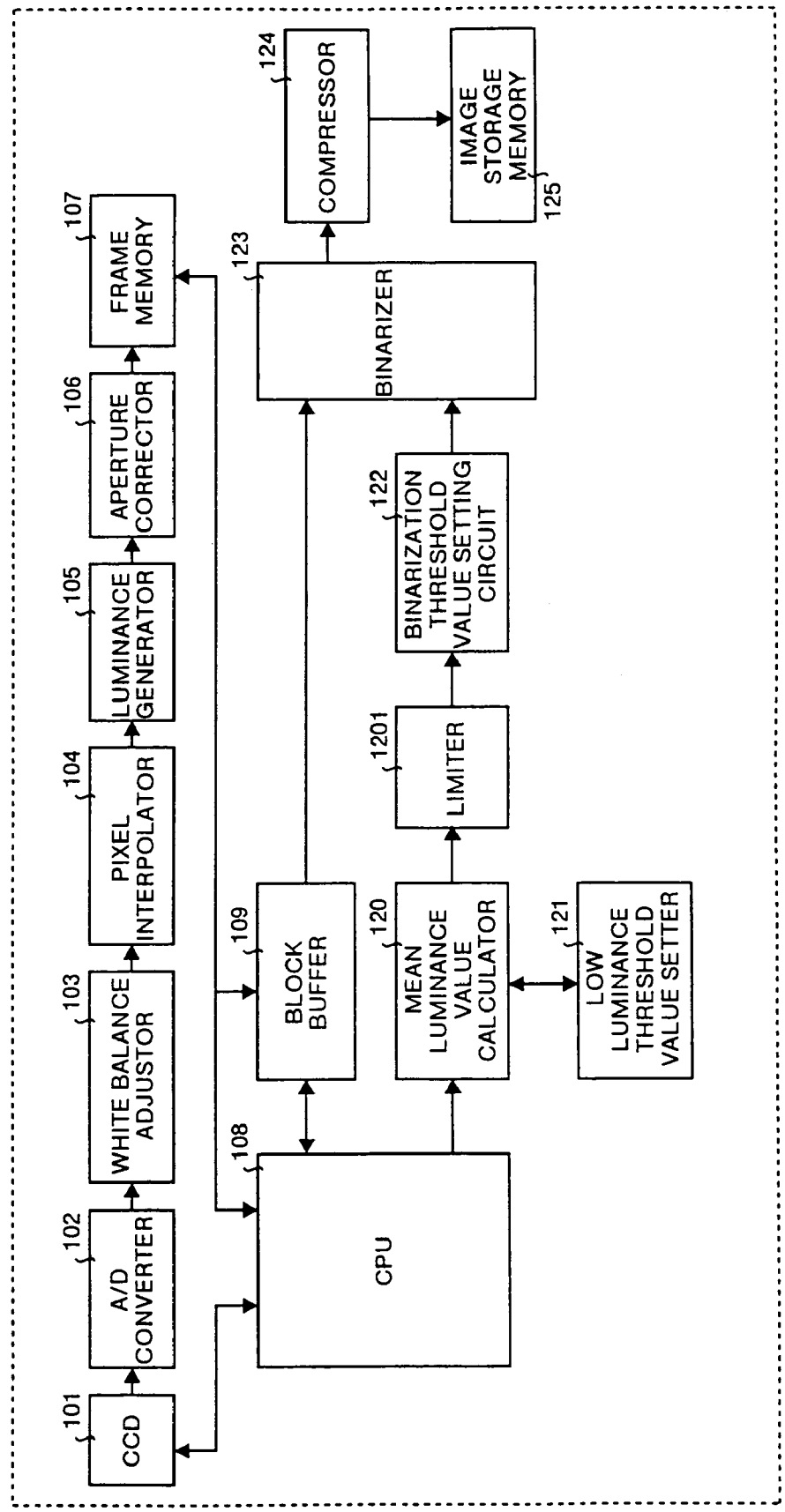
FIG. 12 is a block diagram showing an example of the apparatus structure when an image binarization apparatus of the fifth embodiment of the present invention is used in a digital camera.

In the fifth embodiment, a description is given of when an image binarization apparatus in which the spread of the mean luminance values is limited so that the values are contained within a predetermined range is used in a digital camera. FIG. 12 is a block diagram showing an example of the apparatus structure of a digital camera in which the spread of the mean luminance values is limited so that the values are contained within a predetermined range. Note that structural sections of the present embodiment identical to those in the first embodiment are given the same symbols and a description thereof is omitted.

The digital camera 1200 is provided with a limiter 1201 which limits the mean luminance values output from the mean luminance value calculator 120 using a preset lower limit value, so that mean luminance values which are too low are prevented from being outputted. An example thereof might be relatively bright characters in a dark image, or a more specific example might be a picture of a cat drawn in white chalk on a blackboard. Compared to the area of the blackboard, the area of the white chalk figure is extremely small, however, in this case, the important information is the image of the cat drawn in white chalk. If normal binarization is performed in this case, the image data of the portions of the blackboard other than those portions containing the image of the cat in white chalk becomes dominant. As a result, the binarization threshold value ends up being set at the boundaries between light and dark of the black portions of the blackboard. Consequently, the white chalk image is naturally judged to be white, however, white chalk dust and fragments (for example, the track left by a blackboard eraser or the like) are also judged to be white and the end result is that noise is increased.

The limiter 1201 adjusts the mean average luminance values so that this type of noise is not reproduced. Specifically, a determination is made as to whether or not any mean luminance values exist within a predetermined range and, if the result of this determination is negative, then the mean value is substituted for the lower limit value or upper limit value of that range. By setting the lower limit (or upper limit) of the mean luminance value using the limiter 1201, it is possible to obtain a binarized image with high contrast. Depending on the mode of use, it is also possible to limit the mean luminance value by a predetermined upper limit value so that a mean luminance value which is too high is not output.

Note that, in the present embodiment, a CCD 101 is used, however, depending on the mode of use, it is also possible to use a CMOS sensor 701 (see FIG. 7) as in the second embodiment.

Figure 13:
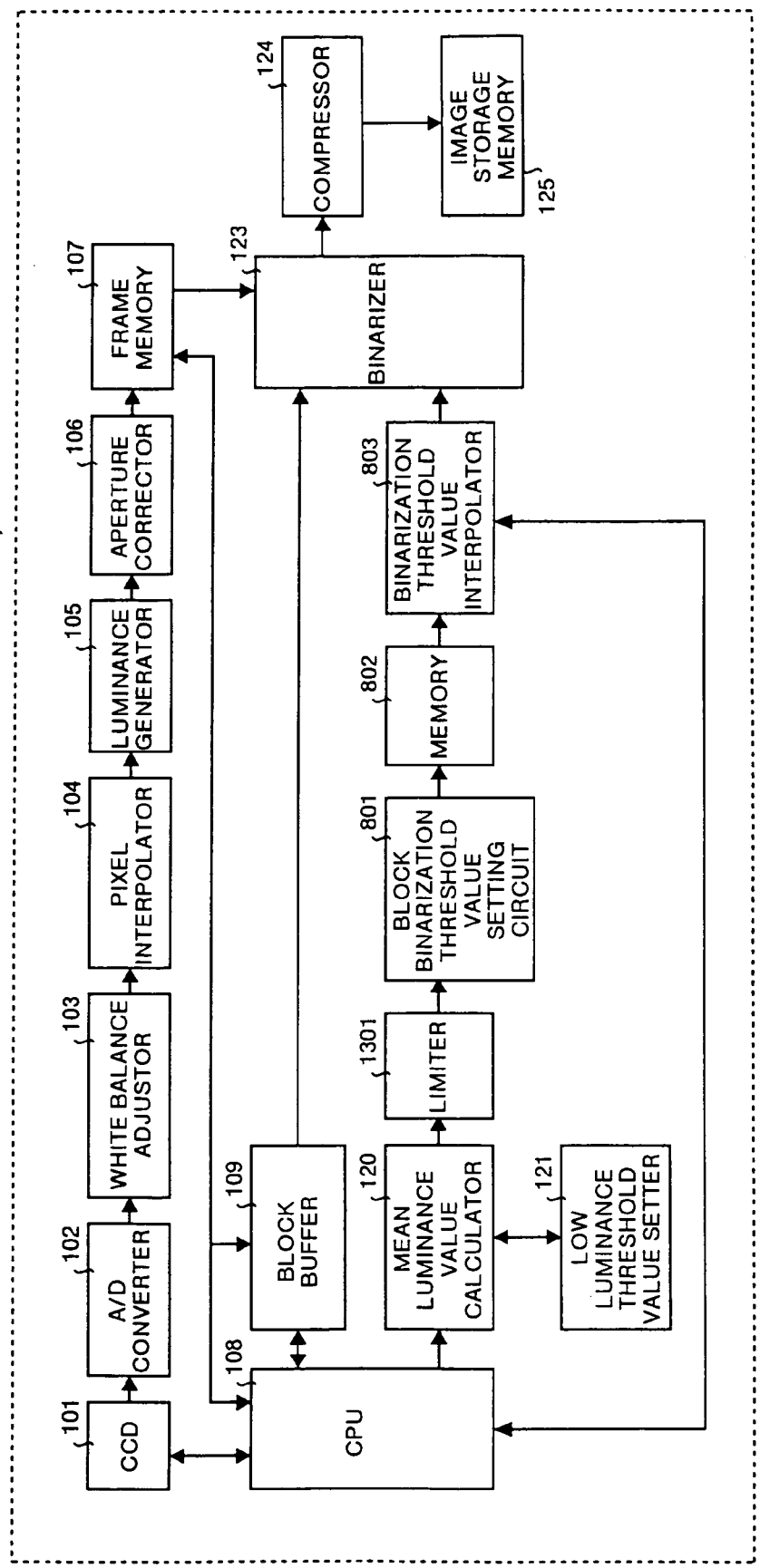
FIG. 13 is a block diagram showing an example of the apparatus structure when an image binarization apparatus of the sixth embodiment of the present invention is used in a digital camera.

In this sixth embodiment, the description given is of when a digital camera uses an image binarization apparatus in which binarization threshold values applied to each pixel in a predetermined block are calculated and binarization of the image data performed for each pixel, with the spread of the mean luminance values limited so as to be within a predetermined range. FIG. 13 is a block diagram showing an example of the structure of a digital camera according to the present embodiment. Note that portions of the structure of the present embodiment which are identical to those of the fifth embodiment are given the same symbols and a description thereof is omitted.

The digital camera 1300 is provided with a limiter 1301 which limits the mean luminance values output from the mean luminance value calculator 120 using a preset upper limit value, so that mean luminance values which are too low are prevented from being outputted. Mean luminance values output from the limiter 1301 are within a predetermined range. For example, mean luminance values which stand out due to being affected by the reflected flash from a whiteboard or the like are adjusted so as to fall within a predetermined range. Accordingly, block binarization threshold values set by the block binarization threshold value setting circuit 801 can be prevented from being inconsistent with the values of other blocks.

In particular, in the present embodiment, binarization threshold values to be applied to each pixel in an interpolation block are calculated by the binarization threshold value interpolator 803 using the block binarization threshold values of surrounding object blocks. At this time, because mean luminance values which standout are removed by the limiter 1301, each binarization threshold value can be more appropriately set. As a result, even higher quality binarization processing becomes possible. Depending on the mode of use, it is also possible for the mean luminance values to be limited by a lower limit value set in advance so that mean luminance values which are too low are not output. Moreover, the limiter 1301 may also set a predetermined range using the block binarization threshold values.

Note that, in the present embodiment, a CCD 101 is used, however, depending on the mode of use, it is also possible to use a CMOS sensor 1101 (see FIG. 11) as in the fourth embodiment.

Figure 14:
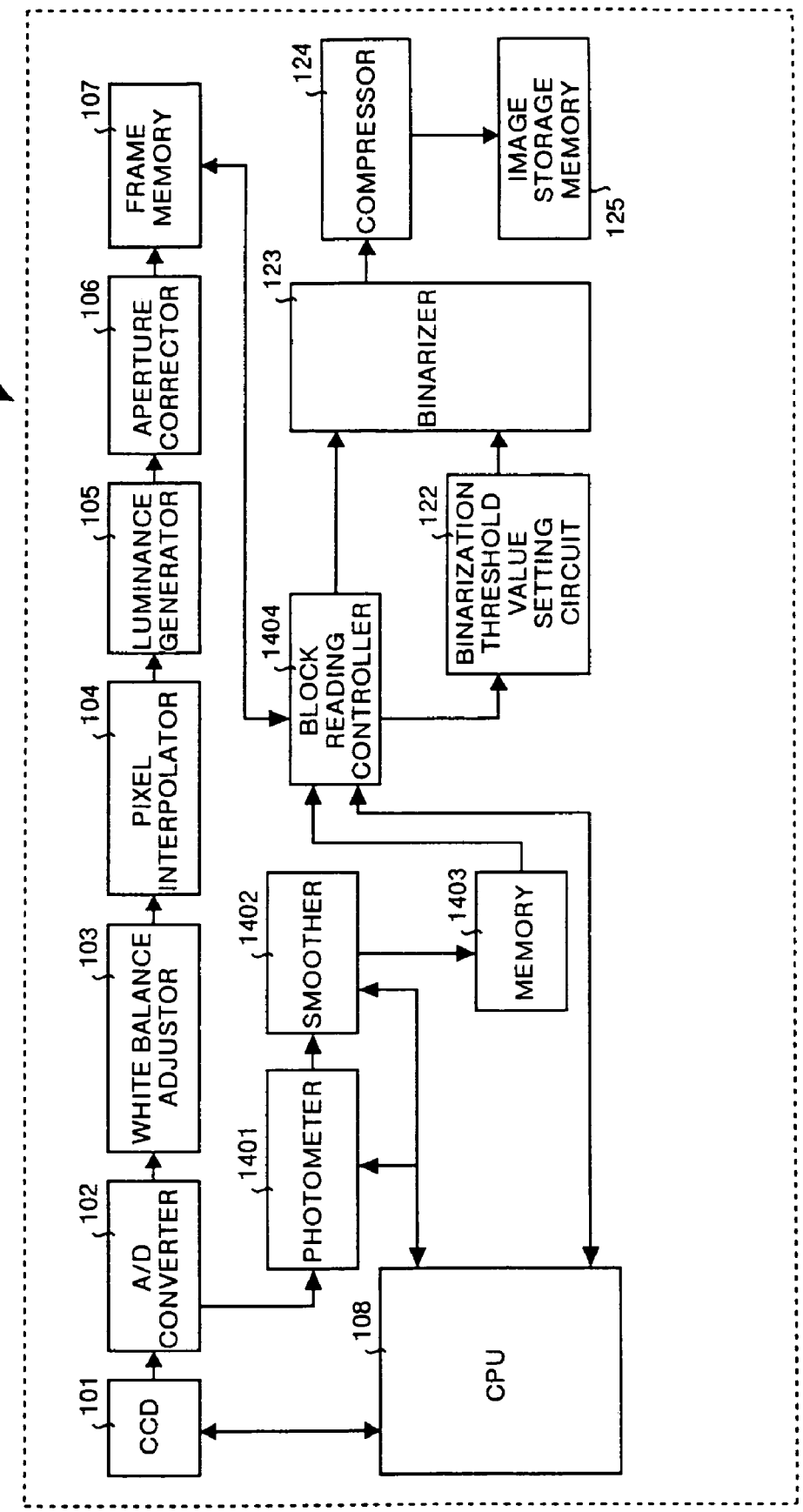
FIG. 14 is a block diagram showing an example of the image pickup apparatus of the seventh embodiment of the present invention when it is used in a digital camera.

The seventh embodiment explained below relates to an image binarization apparatus having a photometry unit. FIG. 14 is a block diagram showing an example of the apparatus structure from an image input until a recording of a binarized image when an image pickup apparatus provided with a photometer is used in a digital camera. Note that, in the present embodiment, because the structural elements are similar to those of the first embodiment, the same structural elements as those of the first embodiment are given the same symbols and a detailed description thereof is omitted. Those portions that are different to the first embodiment are mainly described.

The digital camera 1400 comprises the CCD 101, the A/D converter 102, the white balance adjustor 103, the pixel interpolator 104, the luminance generator 105, the aperture corrector 106, the frame memory 107, the CPU 108, a photometer 1401, a smoother 1402, memory 1403, a block reading controller 1404, the binarization threshold value setting circuit 122, the binarizer 123, the compressor 124, and the image storage memory 125.

The CCD 101 converts light converged by a not shown optical system of the digital camera 1400 into electric signals and outputs R, G, B analog signals for each pixel forming a multi-valued image. The output analog signals are converted into digital signals by the A/D converter 102. As they pass through the white balance adjustor 103, the pixel interpolator 104, the luminance generator 105, and the aperture corrector 106, the digital signals undergo processing such as luminance value interpolation, extraction, and the like and are then temporarily stored in the frame memory 107.

Based on luminance information from the photometer 1401 (described below), the CPU 108 controls the block reading controller 1404 (described below) and divides an image stored in the frame memory 107 in the way same as the screen division used by the photometer 1401 for photometry. The screen division used for photometry by the photometer 1401 may also be fixed. Alternatively, it may also be divided through the control of the CPU 108, in the same way as in FIG. 3. The CPU 108 controls the other circuits and members of the digital camera 1400.

The photometer 1401 is provided with an automatic exposure (AE) detection mechanism for performing photometry on an object to be photographed before photographing an image, and measures the brightness of each screen based on digital signals output from the A/D converter 102. The method of the photometry may, for example, comprise measurement by adding the luminance values of the pixels. At this time, it is also possible for the CPU 108 to sample photometric values for the photometer 1401 to use in the addition. Note that, depending on the mode of use, it is also possible to use a light amount photo-electrically converted by the CCD 101.

The smoother 1402 smoothes the photometric values of each screen obtained by the photometer 1401 and outputs them as ave(i, j) to the memory 1403. The processing below is an example of this smoothing. When the mean value ave(i, j) of the photometric values of all the pixels contained in one screen (this screen is referred to here as G(i, j)) within the photometer 1401 (alternatively, the mean value of the photometric values sampled from within the screen G(i, j)) is inconsistent with the mean values of the photometric values of the surrounding screens, the photometric values of each pixel of the screen G(i, j) are corrected so as to be consistent with the mean values of the photometric values of the surrounding screens.

An example of an algorithm for performing this processing is given below. The mean photometric value of the four screens adjacent to the screen G(i, j) is set as ave4(i, j). If the mean photometric value ave(i, j) of the screen G(i, j) is three times the value ave4(i, j) or more, then the photometric values of each pixel in the screen G(i, j) (referred to here as s(x, y)) are converted using the following equation (11):

$$\text{if } ave(i, j) \geq 3 \times ave4(i, j) \quad (11)$$
$$\text{then } s(i, j) = ave4(i, j) + (1/4) \times (s(i, j) - ave4(i, j))$$

In the smoother 1402, the converted photometric values are used to recalculate the mean photometric value ave(i, j) of the screen G(i, j) and the mean photometric value is then outputted to the memory 1403. The memory 1403 stores this mean photometric value.

The block reading controller 1404 divides the images stored in the frame memory 107 in the same way as the screen division used for photometry by the photometer 1401. As a result, the binarization threshold values are made more natural.

The binarization threshold value setting circuit 122 sets the binarization value TH(i, j) based on the ave(i, j). The setting unit is a multiplier for multiplying the ave(i, j) by a preset coefficient Cb, however, if the coefficient Cb is made to equal x/16 or Cb is made to equal x/8 (wherein x is a predetermined value representing a natural number no greater than the denominator), then the binarization threshold value setting circuit 122 can be constructed simply from an adder, which is efficient in terms of both cost and speed.

Based on the binarization threshold value TH(i, j), the binarizer 123 binarizes each pixel of the block B(i, j) corresponding to the screen G(i, j). Note that smoothed blocks are binarized through appropriate processing using converted photometric values. The compressor 124 performs compression appropriate to a binary image such as MH or MR. The compressed image is then stored in the image storage memory 125.

In the above description, the CCD 101 corresponds to the image pickup unit; the CPU 108 and the photometer 1401 correspond to the screen division unit; the photometer 1401 corresponds to the photometry unit; the CPU 108 corresponds to the block division unit; the binarization threshold value setting circuit 122 corresponds to the binarization threshold value setting unit; the binarizer 123 corresponds to the binarization unit; and the smoother 1402 corresponds to the photometric value smoothing unit.

Figure 15:
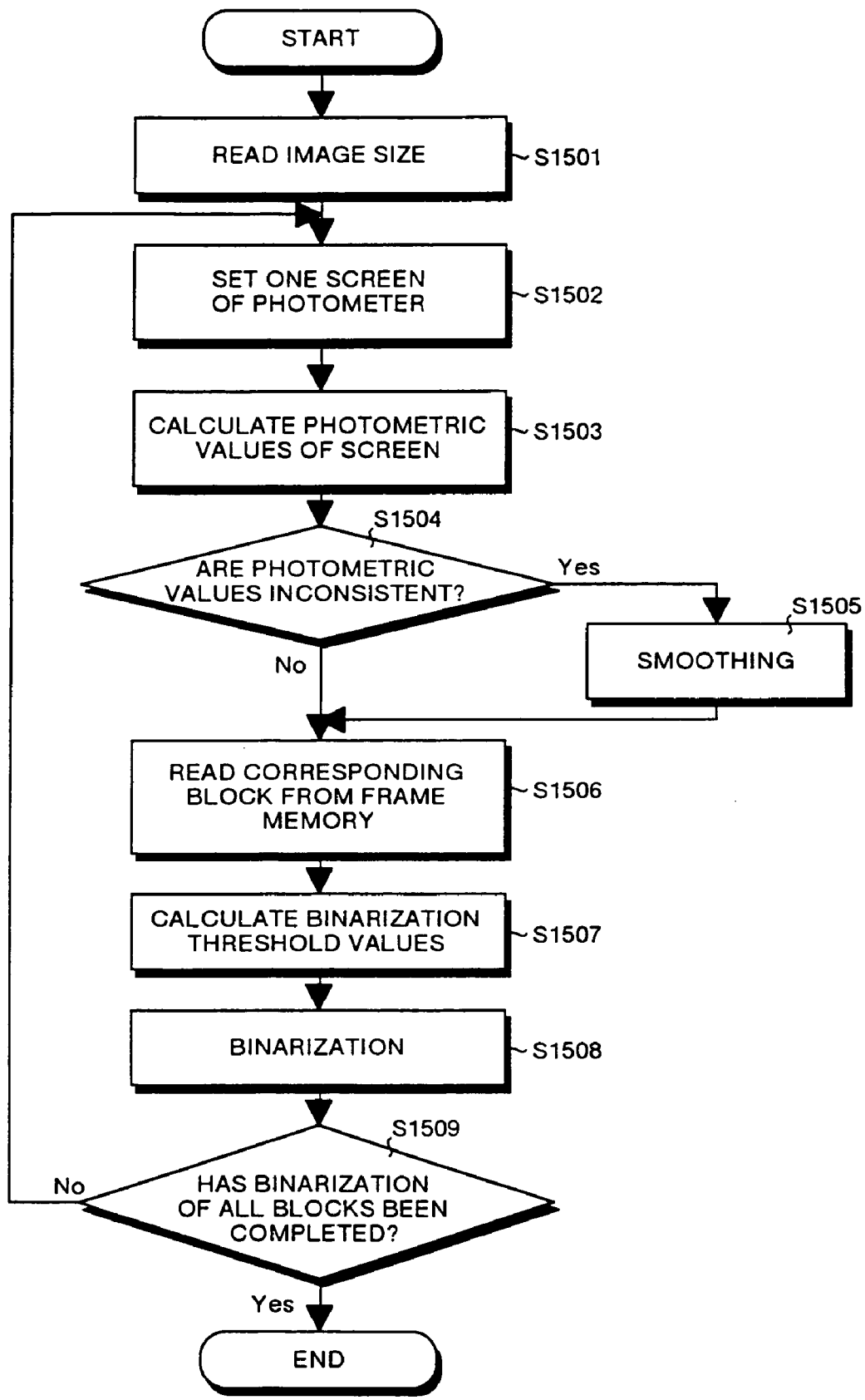
FIG. 15 is a flow chart showing the flow of image data processing as far as the binarization of a multi-valued image in a digital camera of the seventh embodiment.

Next the flow of the image data processing as far as the binarization of a multi-valued image will be described. FIG. 15 is a flow chart showing the flow of data processing as far as the binarization of multi-valued image. Firstly, the CPU 108 reads the size of the image from the CCD 101 (step S1501). Next, the CPU 108 sets a screen G(i, j) from the photometric values output from the photometer 1401 (step S1502) and calculates the mean value of the photometric values of that screen (step S1503). The mean may be determined using all the photometric values or using an appropriate sampling thereof.

Next, a determination is made as to whether or not the mean value of the photometric values of the screen is inconsistent with the mean values of the photometric values of adjacent screens (step S1504). If the mean value is inconsistent (i.e. the result of determination in step S1504 is YES), then the mean value of the photometric values is smoothed using the smoother 1402 (step S1505). If the mean value is not inconsistent (i.e. the result of determination in step S1504 is NO), or alternatively, if the smoothing processing of step S1505 has been completed, the block reading controller 1404 reads the block B(i, j) which corresponds to the screen G(i, j) from the frame memory 107 (step S1506) and calculates the binarization threshold value based on the photometric value of the screen G(i, j) (Step S1507). The multi-valued image within that block is then binarized using this binarization threshold value (step S1508).

A determination is then made as to whether or not binarization of all blocks has been completed (step S1509). If all blocks have been binarized (i.e. if the result of determination in step S1509 is YES), the binarization processing is completed. If not all blocks have been binarized (i.e. if the result of determination in step S1509 is NO), the routine returns to step S1502, the next screen (for example, the screen G(i+1, j)) is set, and the subsequent steps S1502 to S1509 are repeated.

In this seventh embodiment, because a binarization threshold value is set using information (photometric values) obtained from an automatic photometry section provided in a digital camera, there is no need for separate processing to set the binarization threshold value. As a result, the circuit structure is simplified and the cost thereof reduced. At the same time, because separate binarization threshold value calculation processing is unnecessary, power consumption can be reduced. In addition, even if the image has pinpoint reflections from a light source, high quality binarization of a multi-valued image is possible.

Figure 16:
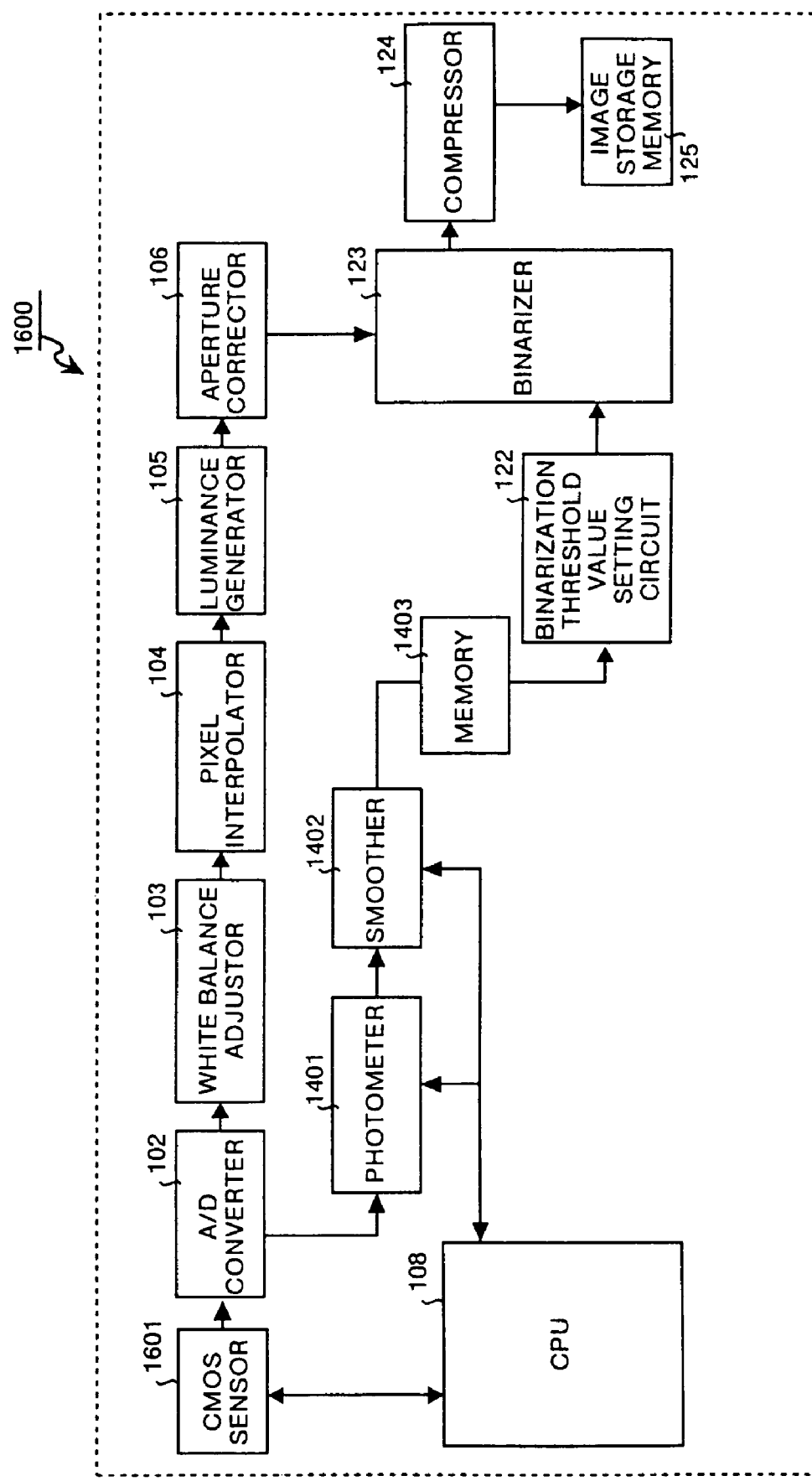
FIG. 16 is a block diagram showing an example of the apparatus structure as far as the binarization and recording of an input image in a digital camera using a CMOS sensor in the image input section.

The eighth embodiment explained below relates to an image pickup apparatus using a CMOS sensor is described. FIG. 16 is a block diagram showing an example of the apparatus structure until an input image is binarized and recorded of a digital camera using a CMOS sensor in the image input section thereof. Note that, in the present embodiment, portions identical to those of the seventh embodiment are given the same descriptive symbols as in the seventh embodiment and a description thereof is omitted. The description given here is of those portions that differ from the seventh embodiment.

The digital camera 1600 is provided with a CMOS sensor 1601 in the image input section thereof. Accordingly, unlike the CCD 101 which can only perform raster scanning (see FIG. 14), the CMOS sensor 1601 is capable of random access and reading single block units. Therefore, the frame memory 107 and the block reading controller 1404 are unnecessary allowing the circuit structure to be simplified. In this case, the CPU 108 performs the functions of the block reading controller.

Further, in contrast, to the CCD 101 which requires a separate power source to the CMOS integrated circuit, the CMOS sensor 1601 is able to use the same power source as the CMOS integrated circuit, enabling power consumption to be reduced. As a result, because the scale of the circuitry of the digital camera 1600 can also be reduced, this system is far more efficient in terms of power consumption, processing speed and cost than a system using a CCD. Note that, in the present embodiment, a CMOS sensor was employed, however, any other image pickup apparatus having a block accessible image input section may be used.

Figure 17:
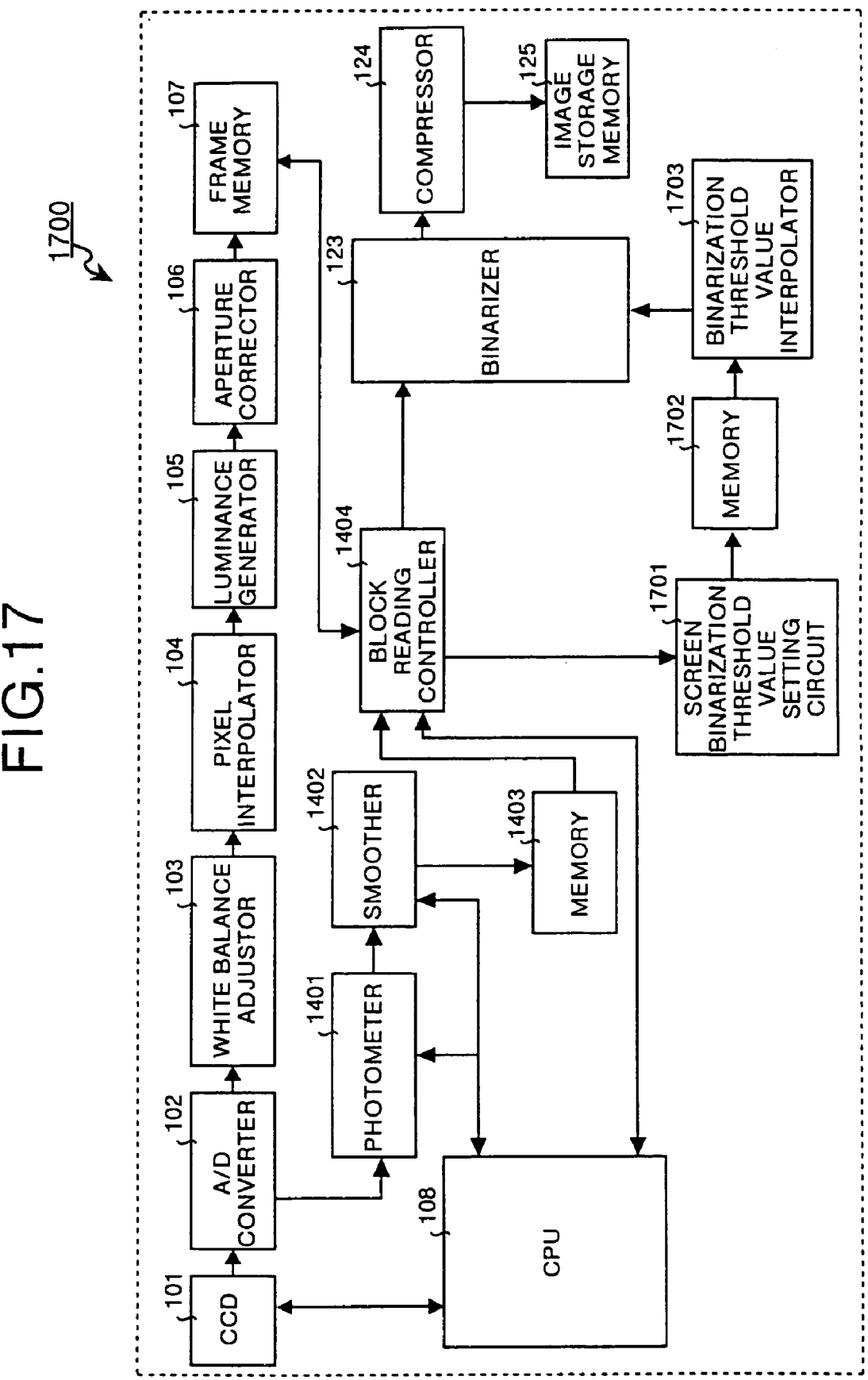
FIG. 17 is a block diagram showing an example of the image pickup apparatus of the ninth embodiment of the present invention when it is used in a digital camera.

The ninth embodiment explained below relates to an image pickup apparatus which is provided with a photometry unit, which calculates binarization threshold values to be applied to each pixel in a predetermined block, and which performs binarization of image data for each pixel is used in a digital camera. FIG. 17 view shows an example of the structure when an image pickup apparatus which is provided with a photometer and which sets a binarization threshold value for each pixel is used in a digital camera. Note that, because structural elements of the present embodiment are similar to those of the seventh embodiment, those structural elements which are identical to those of the seventh embodiment are given the same descriptive symbols and a description thereof is omitted. The description given here is of those portions that differ from the seventh embodiment.

The digital camera 1700 is provided with a screen binarization threshold value setting circuit 1701 into which are input mean values of photometric values output from the smoother 1402 and stored in the memory 1403, and for outputting values multiplied by a predetermined coefficient (referred to below as screen binarization threshold values) for each screen; memory 1702 for storing screen binarization threshold values; and a binarization threshold value interpolator 1703 for setting binarization threshold values to be applied to each individual pixel in a predetermined block based on the screen binarization threshold values. Note that a section for generating color difference signals is omitted.

The screen binarization threshold value setting circuit 1701 multiplies a coefficient corresponding to a particular screen by a smoothed photometric value. In order to simplify the description below, the screen having the smoothed photometric value a is referred to as Ga, while the predetermined coefficient is referred to as Cb(Ga). The screen binarization threshold value setting circuit 1701 calculates the screen binarization threshold value for all the screens and stores these sequentially in the memory 1702.

The binarization threshold value interpolator 1703 uses the screen binarization threshold values of all the screens stored in the memory 1702 to set binarization threshold values to be applied to each pixel in the interpolation block BH. In the description given below binarization threshold values to be applied to each pixel are set. Note that, the interpolation block BH is set by the block reading controller 1404, however, depending on the mode of use, it is also possible for the interpolation block BH to be set by the CPU 108.

Figure 18A:
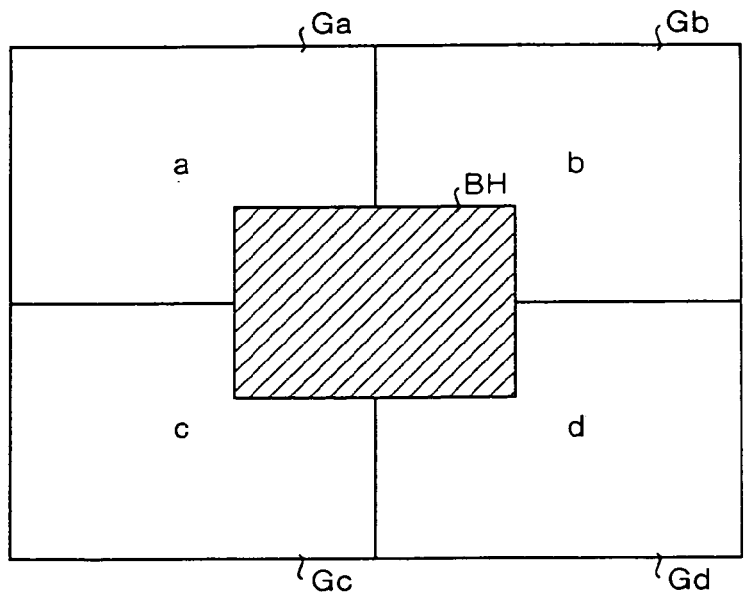
FIG. 18A and FIG. 18B show relationships between an interpolation block and a screen in a digital camera of the ninth embodiment.
Figure 18B:
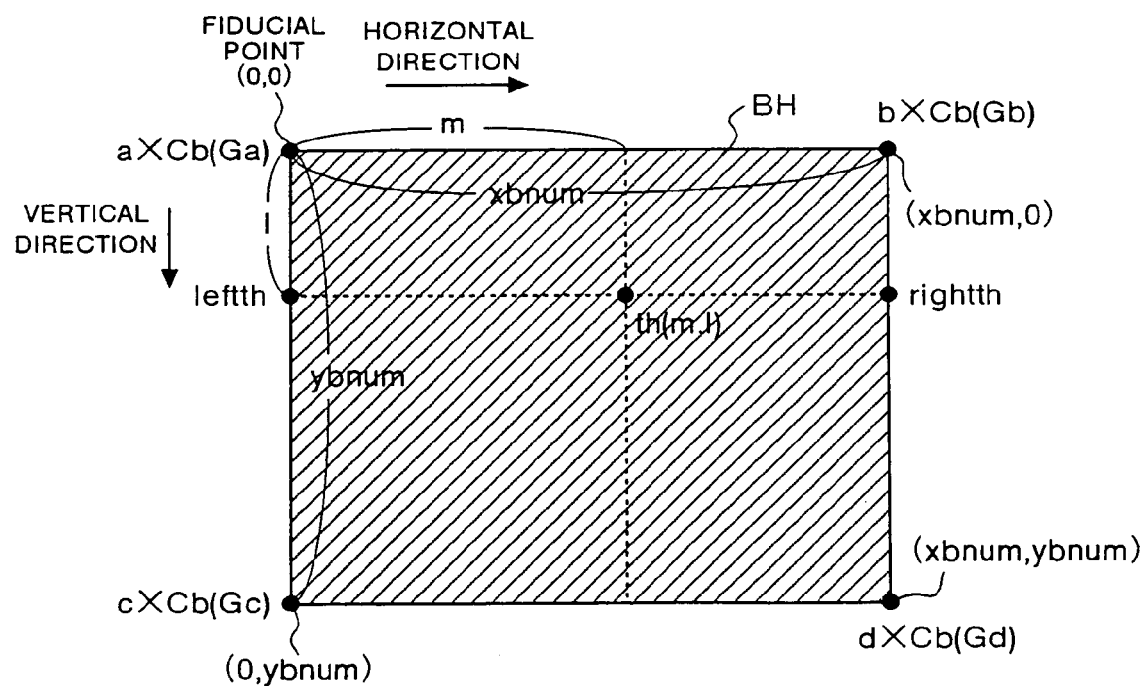

The calculation of the binary threshold value to be applied to each pixel in an interpolation block will now be described in outline. FIG. 18A and FIG. 18B show relationships between an interpolation block and screens. As is clearly shown in the figures, the interpolation block BH bridges four adjacent screens Ga, Gb, Gc, and Gd. Note that the mean values of the smoothed photometric values of the screens Ga, Gb, Gc, and Gd are set respectively as a, b, c, and d. The binarization threshold value interpolator 1703 uses the smoothed mean values of the photometric values a, b, c, and d to calculate the binarization threshold value to be applied to each pixel within the interpolation block BH.

A description will now be given of the method of calculating the binarization threshold value to be applied to a pixel bp inside the interpolation block BH. The shape of the interpolation block BH is taken as being a rectangle with the size (number of pixels) thereof set as xbnum in the horizontal direction and ybnum in the vertical direction. The position of the pixel bp is set as (m, 1). At this time, the value a×Cb(Ga) is at the point (0, 0) of the interpolation block BH, the value b×Cb(Gb) is at the point (xbnum, 0) of the interpolation block BH, the value c×Cb(Gc) is at the point (0, ybnum) of the interpolation block BH, and the value d×Cb (Gd) is at the point (xbnum, ybnum) of the interpolation block BH. The area between these points is linearly approximated.

In the seventh embodiment, the coefficient was given the fixed value Cb, however, in this ninth embodiment, the coefficient is different for each screen. This is necessary in order to make possible higher quality binarization than when using the mean value of the photometric values of each screen. In particular, when the block division and screen division are different, a high quality screen binarization threshold value is set.

The binarization threshold value th to be applied to the pixel bp is calculated using the aforementioned equation (10). Note that, in equations (9) and (10), a, b, c, and d are replaced with a×Cb(Ga), b×Cb(Gb), c×Cb(Gc), and d×Cb(Gd).

In the binarizer 123, luminance values of the pixels bp in the interpolation block taken from the frame memory 107 or the block buffer 109 are compared with the binarization threshold value for the pixel bp calculated by the binarization threshold value interpolator 1703. Binarization of the luminance values of the block BH is then performed. The binarized image data then undergoes image compression appropriate to a binarized image, such as MH or MMR, from the compressor 124, in the same way as in the seventh embodiment.

Figure 19:
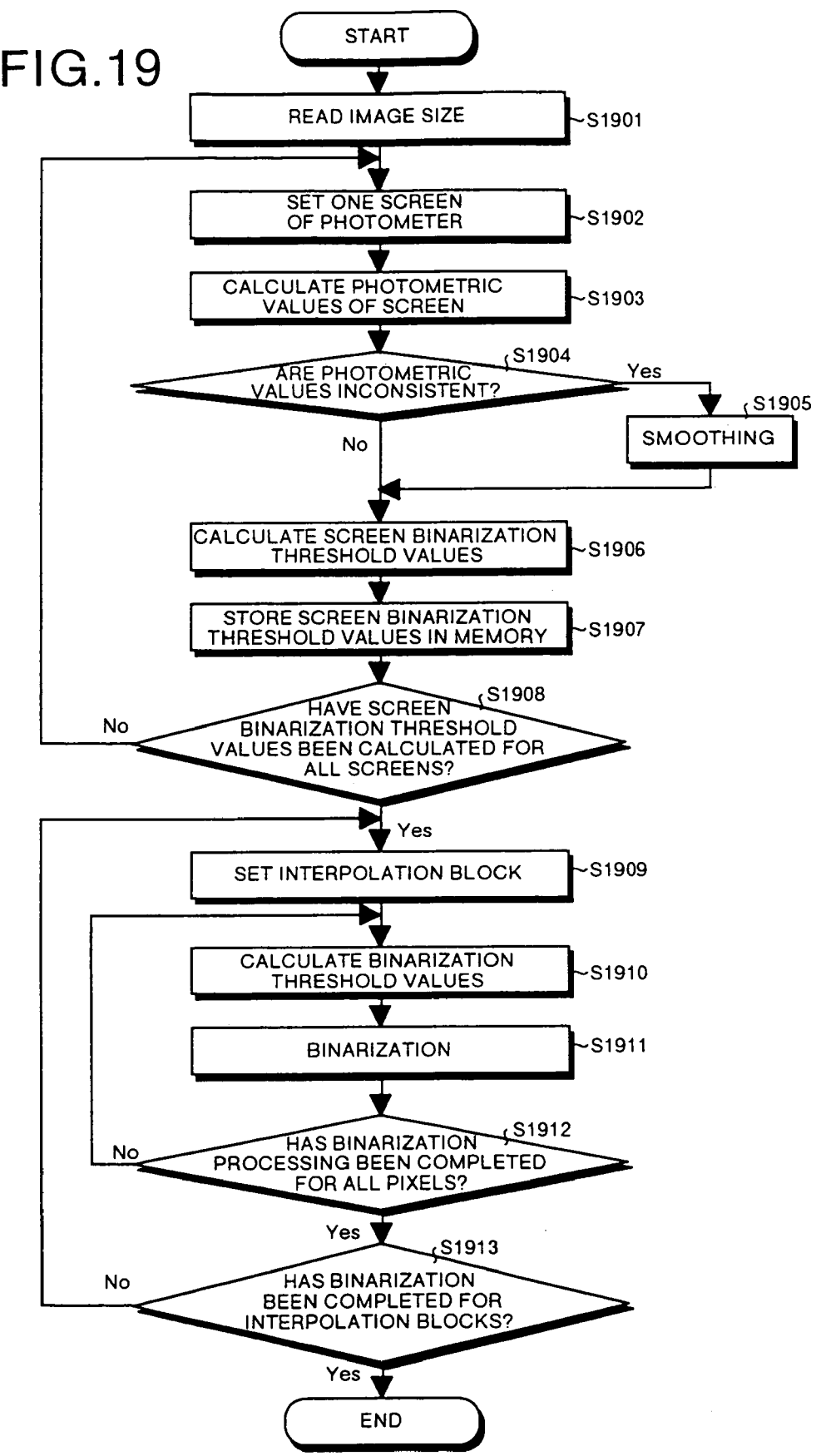
FIG. 19 is a flow chart showing the flow of image data processing as far as the binarization of a multi-valued image in a digital camera of the ninth embodiment.

FIG. 19 is a flowchart showing the flow of image data processing up until a multi-valued image is binarized. Firstly, the CPU 108 reads the size of the image from the CCD 101 (step S1901). Next, the CPU 108 sets one screen G(i, j) from among the photometric values output from the photometer 1401 (step S1902) and calculates the mean value of that screen (step S1903) The mean may be determined using all the photometric values or using an appropriate sampling thereof.

Next, a determination is made as to whether or not the mean value of the photometric values of the screen is inconsistent with the mean values of the photometric values of adjacent screens (step S1904). If the mean value is inconsistent (i.e. the result of determination in step S1904 is YES), then the mean value of the photometric values is smoothed using the smoother 1402 (step S1905). If the mean value is not inconsistent (i.e. the result of determination in step S1904 is NO), or alternatively, if the smoothing processing of step S1905 has been completed, the screen binarization threshold value is calculated based on the mean value of the photometric values (step S1906). This screen binarization threshold value is then stored in the memory 1702 (step S1907).

A determination is then made as to whether or not screen binarization of all blocks has been completed (step S1908). If the screen binarization of all blocks has not been completed (i.e. if the result of determination in step S1908 is NO), the routine returns to step S1902, the next screen (for example, the screen G(i+1, j)) is set, and steps S1902 to S1908 are repeated. If screen binarization of all blocks has been completed (i.e. if the result of determination in step S1908 is YES), the interpolation block is set (step S1909). This interpolation block is suitable for performing partial high quality binarization and may be set in advance by the user, or the central portion of the image may be set via an appropriate mode switching.

The binarization threshold value interpolator 1703 uses the screen binarization threshold values (e.g. a×Cb(Ga)) of the screens bridged by the interpolation block set in step S1909 to set the binarization threshold values th(x, y) of each single pixel in the interpolation block (step S1910).

A pixel (here referred to as g(x, y)) read from the frame memory 107 by the interpolator 123 is binarized using the binarization threshold value calculated in step S1910 (step S1911). Next, a determination is made as to whether or not binarization processing has been performed on all the pixels (step S1912). If binarization has not been performed on all the pixels (i.e. if the result of determination in step S1912 is NO), a pixel in the interpolation block adjacent to g(x, y) (for example, g(x+1, y)) is set, and steps S1910 to S1912 are repeated. If binarization has been performed on all the pixels (i.e. if the result of determination in step S1912 is YES), a determination is made as to whether or not binarization has been completed for all interpolation blocks (step S1913). If binarization has not been completed for all interpolation blocks (i.e. if the result of determination in step S1913 is NO), then steps S1909 to S1913 are repeated. If binarization has been completed for all interpolation blocks (i.e. if the result of determination in step S1913 is YES), then processing is ended.

In this ninth embodiment, because a binarization threshold value is set using information (photometric values) obtained from an automatic photometric section provided in the digital camera, separate processing in order to set a binarization threshold value is unnecessary. As a result, the circuit structure can be simplified and costs can be reduced. At the same time, because a separate binarization threshold value counting processing is unnecessary, power consumption can be reduced. In addition, even if the image has pinpoint reflections from a light source, high quality binarization of a multi-valued image is possible. Furthermore, because binarization threshold values to be applied to each pixel in an interpolation block are set and binarization is performed on the basis of photometric values, higher quality image processing than from the digital camera of the seventh embodiment is possible. In particular, when photographing a notice board or the like, when all of the characters are small or when characters in a portion of the area are small, it is possible to perform partial high quality binarization in those locations.

Figure 20:
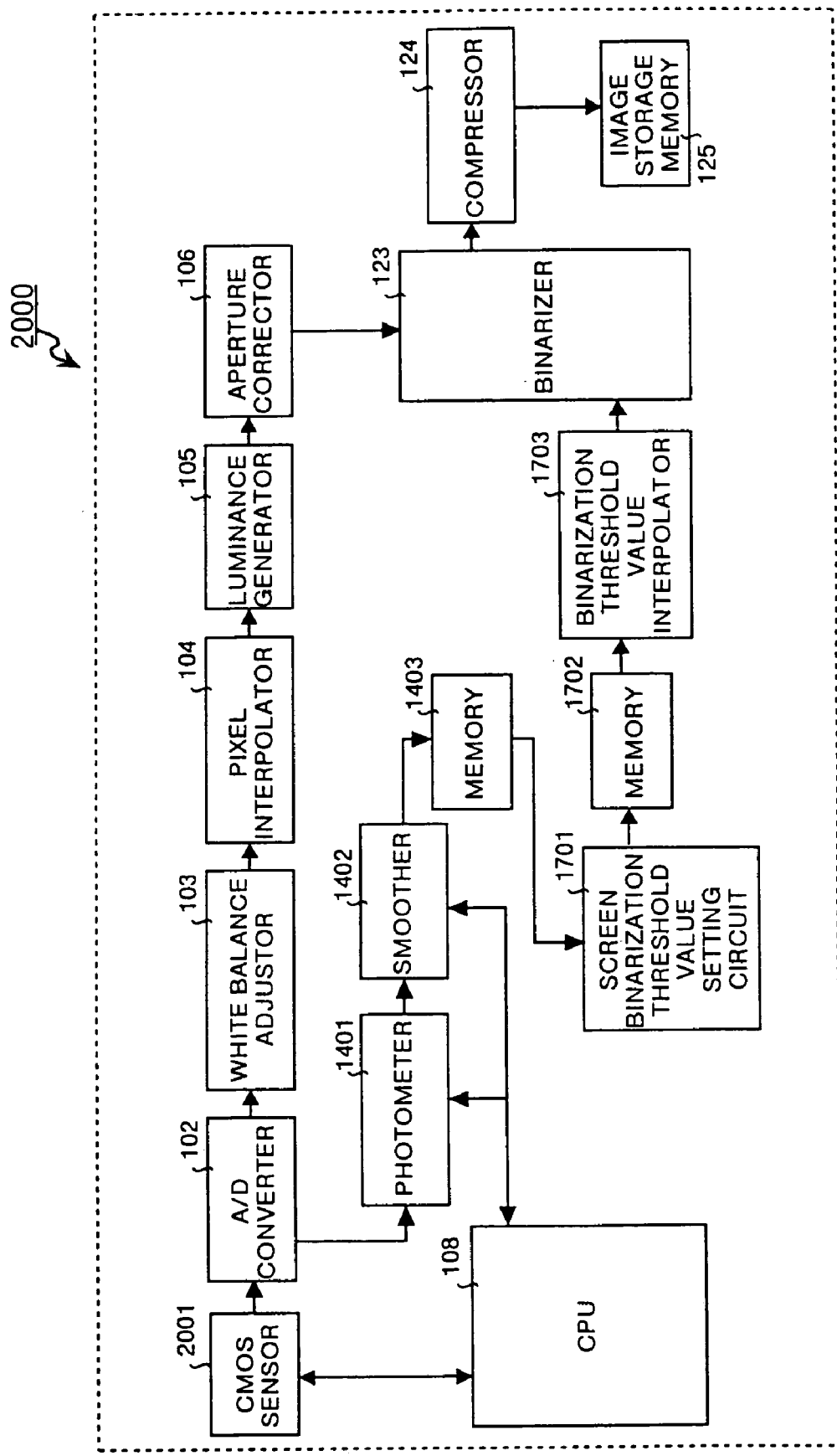
FIG. 20 is a structural diagram showing an example when an image pickup apparatus for calculating binarization threshold values applied to each pixel in a predetermined block and for performing binarization of the image data for each pixel using a CMOS sensor and a photometer is used in a digital camera.

The tenth embodiment explained below relates to an image pickup apparatus which calculates binarization threshold values to be applied to each pixel in a predetermined block and performs binarization of the image data for each pixel using a CMOS sensor and a photometer is used in a digital camera. FIG. 20 is a structural diagram showing an example of a case in which the image pickup apparatus which calculates binarization threshold values to be applied to each pixel in a predetermined block and performs binarization of the image data for each pixel using a CMOS sensor and a photometer is used in a digital camera. Note that those portions of the present embodiment which are identical to those of the ninth embodiment are given the same descriptive symbols and a description thereof is omitted. The description given here is mainly of those portions that differ from the ninth embodiment.

The digital camera 2000 is provided with a CMOS sensor 2001 in the image input section thereof. As a result, unlike the CCD 101 (see FIG. 17) which can only perform raster scanning, because the CMOS sensor 2001 is capable of random access and reading of single block units, the frame memory 107 and block reading controller 1404 are unnecessary, allowing the circuit structure to be simplified. In this case, the CPU 108 performs the functions of the block reading controller.

Further, in contrast, to the CCD 101 which requires a separate power source to the CMOS integrated circuit, the CMOS sensor 2001 is able to use the same power source as the CMOS integrated circuit, enabling power consumption to be reduced. As a result, because the scale of the circuitry of the digital camera 2000 can also be reduced, this system is far more efficient in terms of power consumption, processing speed and cost than a system using a CCD. Note that, in the present embodiment, a CMOS sensor was employed, however, any other image pickup apparatus having a block accessible image input section may be used.

Figure 21:
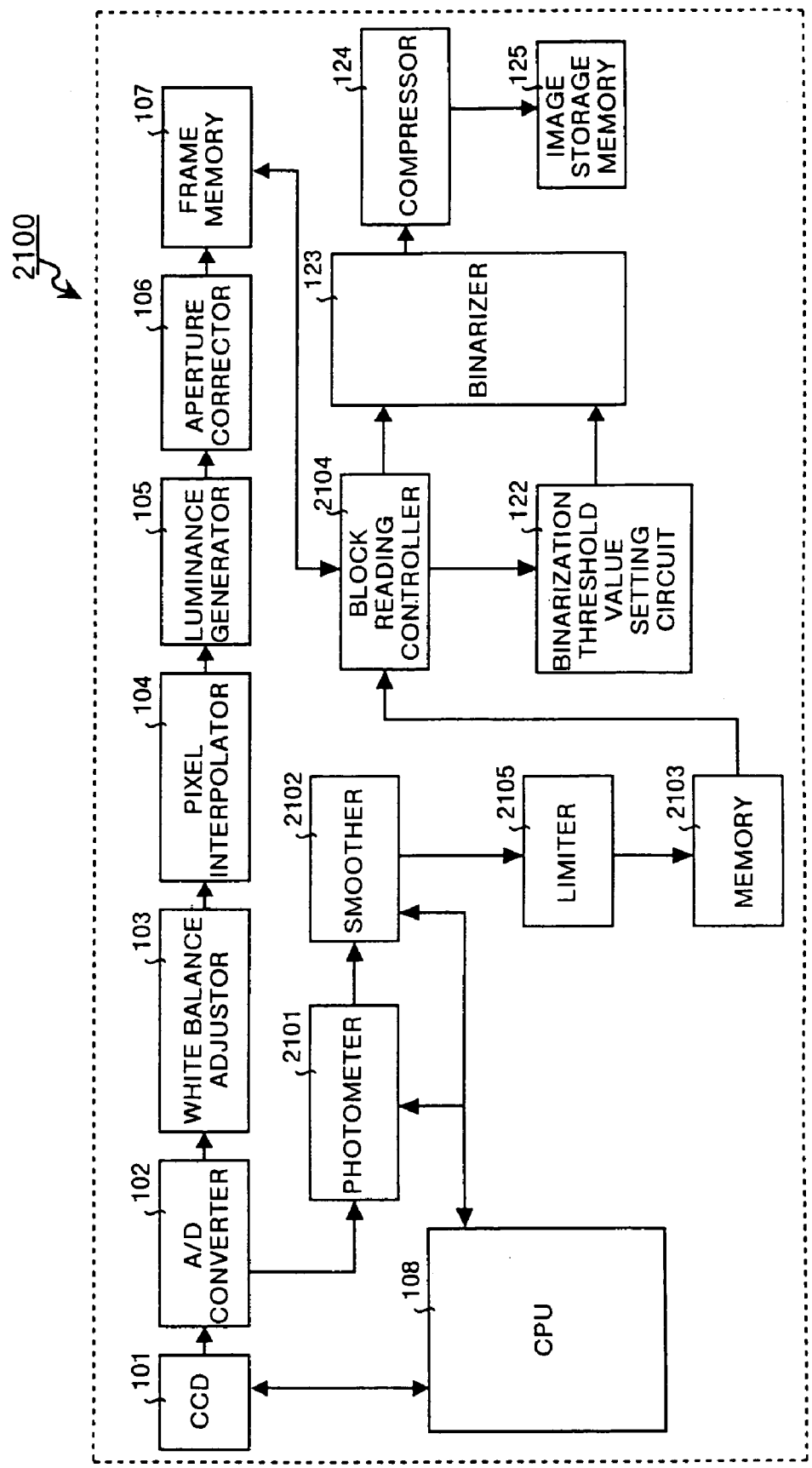
FIG. 21 is a block diagram showing an example of the apparatus structure when an image pickup apparatus of the eleventh embodiment of the present invention is used in a digital camera.

The eleventh embodiment explained below relates to an image pickup apparatus, in which a binarization threshold value is set for each object block based on photometric values output from photometry unit after those photometric values have been adjusted so as to be within a predetermined range, is used in a digital camera. FIG. 21 is a block diagram showing an example of the apparatus structure from image input until a binarized image is recorded when an image pickup apparatus, in which a binarization threshold value is set for each object block based on photometric values output from photometry unit after those photometric values have been adjusted so as to be within a predetermined range, is used in a digital camera.

The digital camera 2100 is provided with the CCD 101, the A/D converter 102, the white balance adjustor 103, the pixel interpolator 104, the luminance generator 105, the aperture corrector 106, the frame memory 107, the CPU 108, a photometer 2101, a smoother 2102, a limiter 2105, memory 2103, a block reading controller 2104, the binarization threshold value setting circuit 122, the binarizer 123, the compressor 124, and the image storage memory 125. Note that a section for generating color difference signals is omitted.

The photometer 2101 is provided with an automatic exposure (AE) detecting mechanism for performing photometry on an object to be photographed before photography of the image. The photometer 2101 measures the brightness of each screen based on digital signals output from the A/D converter 102. The method of the photometry may, for example, comprise measurement by adding the luminance values of the pixels. At this time, the CPU 108 can also sample photometric values to be used in the addition by the photometer 2101.

The smoother 2102 smoothes the photometric values of each screen obtained by the photometer 2101 and outputs them as ave(i, j) to the limiter 2105. The processing below is an example of this smoothing. Namely, when the mean value ave(i, j) of the photometric values of all the pixels contained in one screen (this screen is referred to here as G(i, j)) within the photometer 2101 (alternatively, the mean value of the photometric values sampled from within the screen G(i, j)) is inconsistent with the mean values of the photometric values of the surrounding screens, the photometric values of each pixel of the screen G(i, j) are corrected so that they are consistent with the mean values of the photometric values of the surrounding screens.

An example of an algorithm for performing this processing is given below. The mean photometric value of the four screens adjacent to the screen G(i, j) is set as ave4(i, j). If the mean photometric value ave(i, j) of the screen G(i, j) is three times the value ave4(i, j) or more, then the mean photometric values ave(i, j) of the screen G(i, j) are converted using the following equation (12):

$$\text{if } ave(i, j) \geq 3 \times ave4(i, j) \quad (12)$$
$$\text{then } ave(i, j) = ave4(i, j) + (1/4) \times (ave(i, j) - ave4(i, j))$$

In the smoother 2102, the mean photometric values ave(i, j) of the screen G(i, j) are calculated as described above. Furthermore, by limiting the ave(i, j) to a predetermined lower limit value in the limiter 2105, mean photometric values that are too low are prevented from being output. Then, the mean photometric value is output to the memory 2103. Note that, in the present embodiment, depending on the mode of use, it may also be possible to output photometric values whose range is limited by the limiter 2105 without providing a smoother 2102.

The binarization threshold value setting circuit 122 sets the binarization threshold TH(i, j) based on the ave(i, j) The setting unit is a multiplier for multiplying the ave(i, j) by a preset coefficient Cb, however, if the coefficient Cb is made to equal x/16 or Cb is made to equal x/8 (wherein x is a predetermined value representing a natural number no greater than the denominator), then the binarization threshold value setting circuit 122 can be constructed simply from an adder, which is efficient in terms of both cost and speed.

The binarizer 123 binarizes each pixel of the block B(i, j) which corresponds to the screen G(i, j) based on the binarization threshold value TH(i, j). The compressor 124 performs compression appropriate to a binary image such as MH or MR. The compressed image is then stored in the image storage memory 125.

Figure 22:
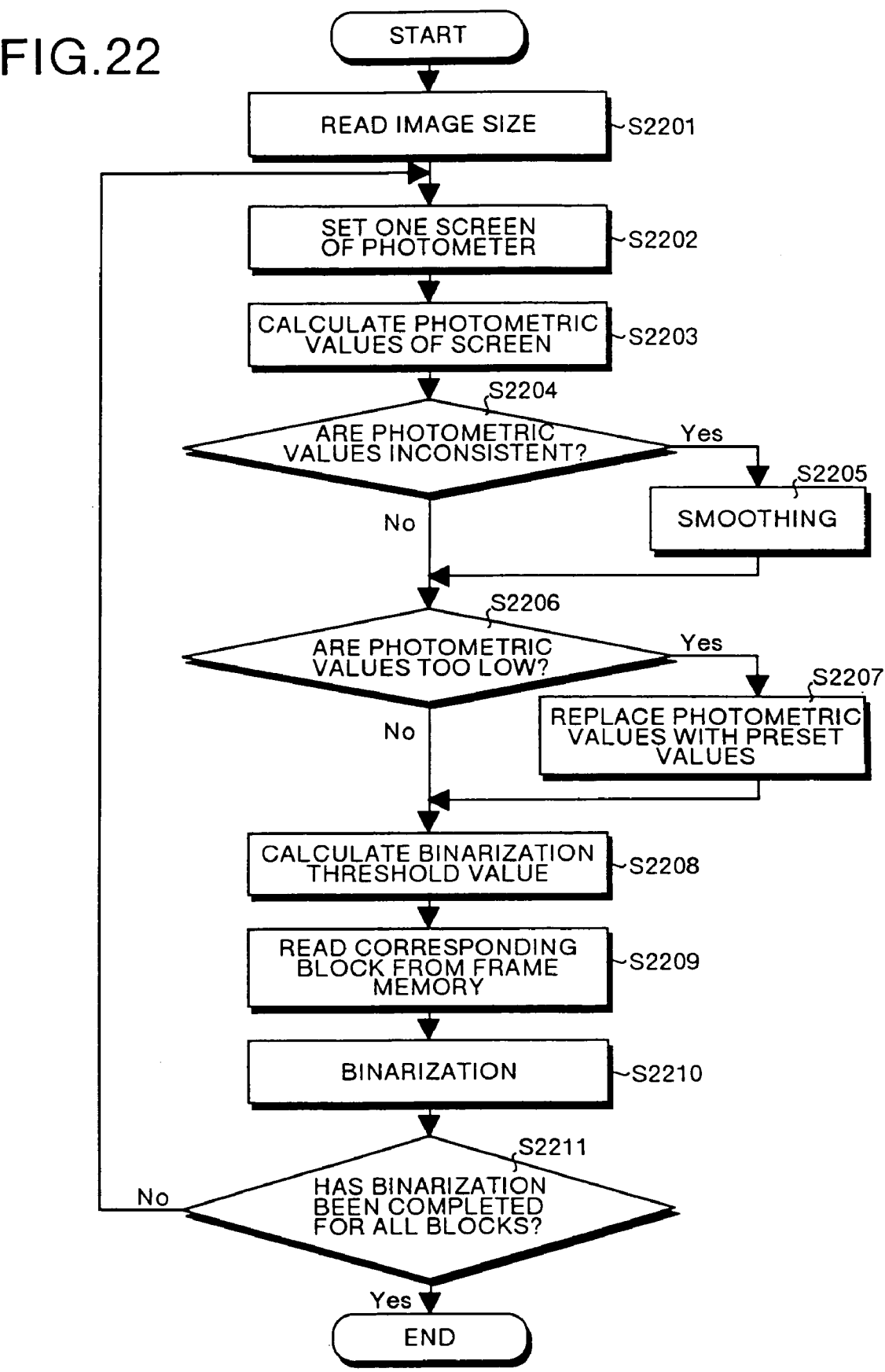
FIG. 22 is a flow chart showing the flow of image data processing as far as the binarization of a multi-valued image in a digital camera of the eleventh embodiment.

Next, the flow of the processing as far as the binarization of a multi-valued image will be described. FIG. 22 is a flow chart showing the flow of the image data processing as far as the binarization of a multi-valued image. Firstly, the CPU 108 reads the size of the image from the CCD 101 (step S2201). Next, the CPU 108 sets one screen G(i, j) from among the photometric values output from the photometer 2101 (step S2202) and calculates the mean value of that screen (step S2203) All the photometric values or a suitable sampling thereof may be used to determine the mean.

Next, a determination is made as to whether or not the mean value of the photometric values of the screen is inconsistent with the mean values of the photometric values of adjacent screens (step S2204). If the mean value is inconsistent (i.e. the result of determination in step S2204 is YES), then the mean value of the photometric values is smoothed using the smoother 2102 (step S2205). If the mean value is not inconsistent (i.e. the result of determination in step S2204 is NO), or alternatively, if the smoothing processing of step S2205 has been completed, then a determination is made as to whether or not the output photometric values are too low (step S2206). If the output photometric values are too low (i.e. the result of determination in step S2206 is YES), the photometric values are replaced with preset values (step S2207). If the output photometric values are not too low (i.e. if the result of determination in step S2206 is NO), or alternatively, if the values have been replaced in step S2207, then a binarization threshold value is calculated based on the photometric values of the screen G(i, j) (step S2208).

Next, the block B(i, j) which corresponds to the screen G(i, j) is read from the frame memory 107 by the block reading controller 2104 (step S2209), and the multi-valued image within the block is binarized using the binarization threshold value (step S2210). A determination is then made as to whether or not binarization of all the blocks has been completed (step S2211). If binarization of all the blocks has been completed (i.e. if the result of determination in step S2211 is YES), the binarization processing is ended. If binarization of all the blocks has not been completed (i.e. if the result of determination in step S2211 is NO), the routine returns to step S2202, the next screen is set (for example, G(i+1, j)), and the steps 2202 to S2211 are repeated.

In this eleventh embodiment, because a binarization threshold value is set using information (photometric values) obtained from an automatic photometry section provided in a digital camera, there is no need for separate processing to set the binarization threshold value. As a result, the circuit structure is simplified and the cost thereof reduced. Further, because separate binarization threshold value calculation processing is unnecessary, power consumption can be reduced. In addition, even if the image has pinpoint reflections from a light source, high quality binarization of a multi-valued image is possible. Moreover, by using a smoother and a limiter in combination, binarization threshold values are set efficiently.

Figure 23:
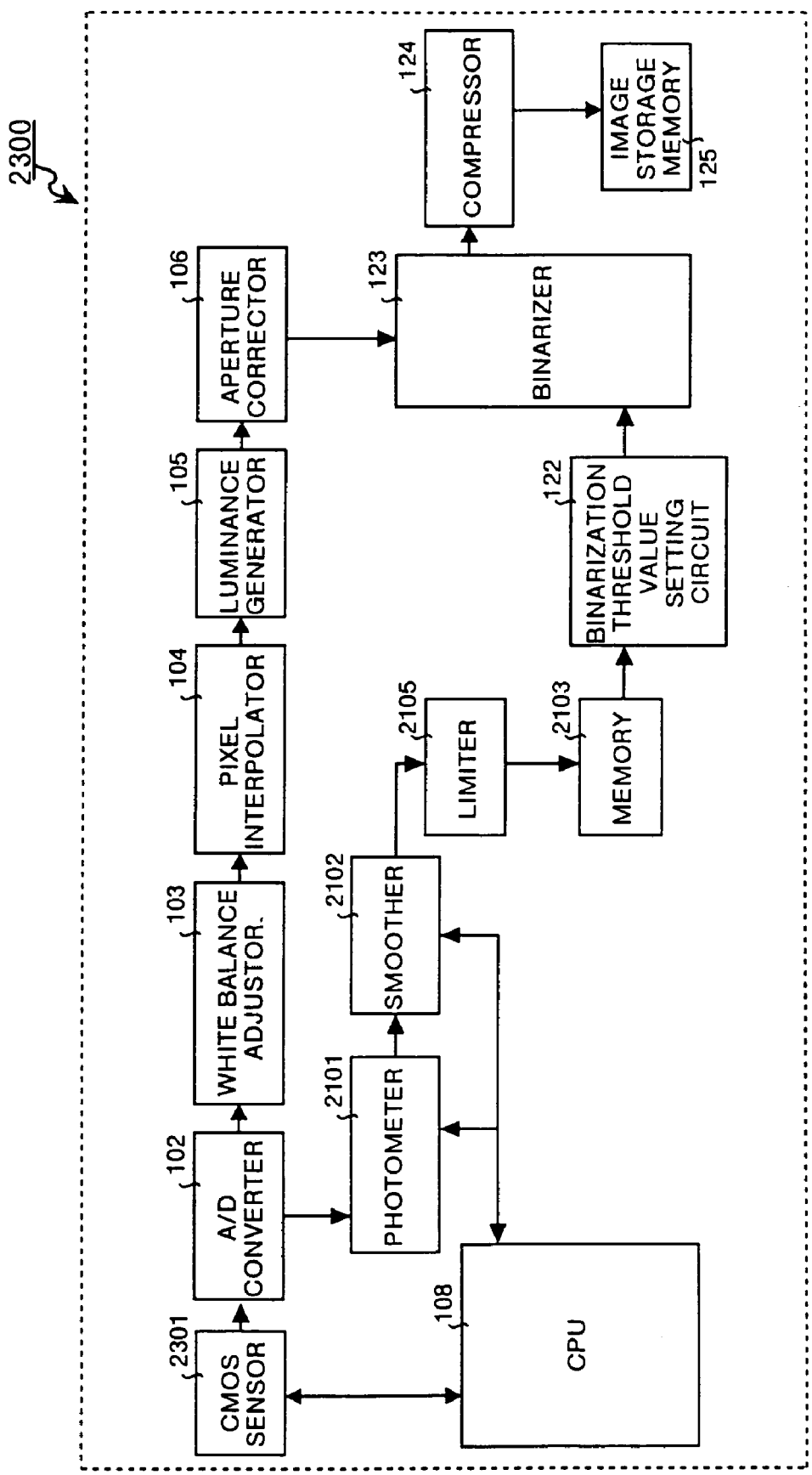
FIG. 23 is a block diagram showing another example of the apparatus structure of a digital camera of the eleventh embodiment.

Note that a CMOS sensor 101 is used in the digital camera 2100, however, depending on the mode of use, a structure in which a CMOS sensor 2301 is used in the digital camera 2300, as is shown in FIG. 23, may be employed. By employing this type of structure, frame memory and a block, reading controller become unnecessary and the circuit structure is simpler in comparison to the digital camera 2100. Moreover, the CMOS sensor 2301 can use the same power source as a CMOS integrated circuit, enabling power consumption to be reduced. As a result, the scale of the circuitry of the digital camera 2300 can be made smaller than that of the digital camera 2100 and the power consumption is also smaller. Consequently, it is possible to provide a more efficient digital camera than the digital camera 2100 in terms of power consumption, processing speed and cost.

Figure 24:
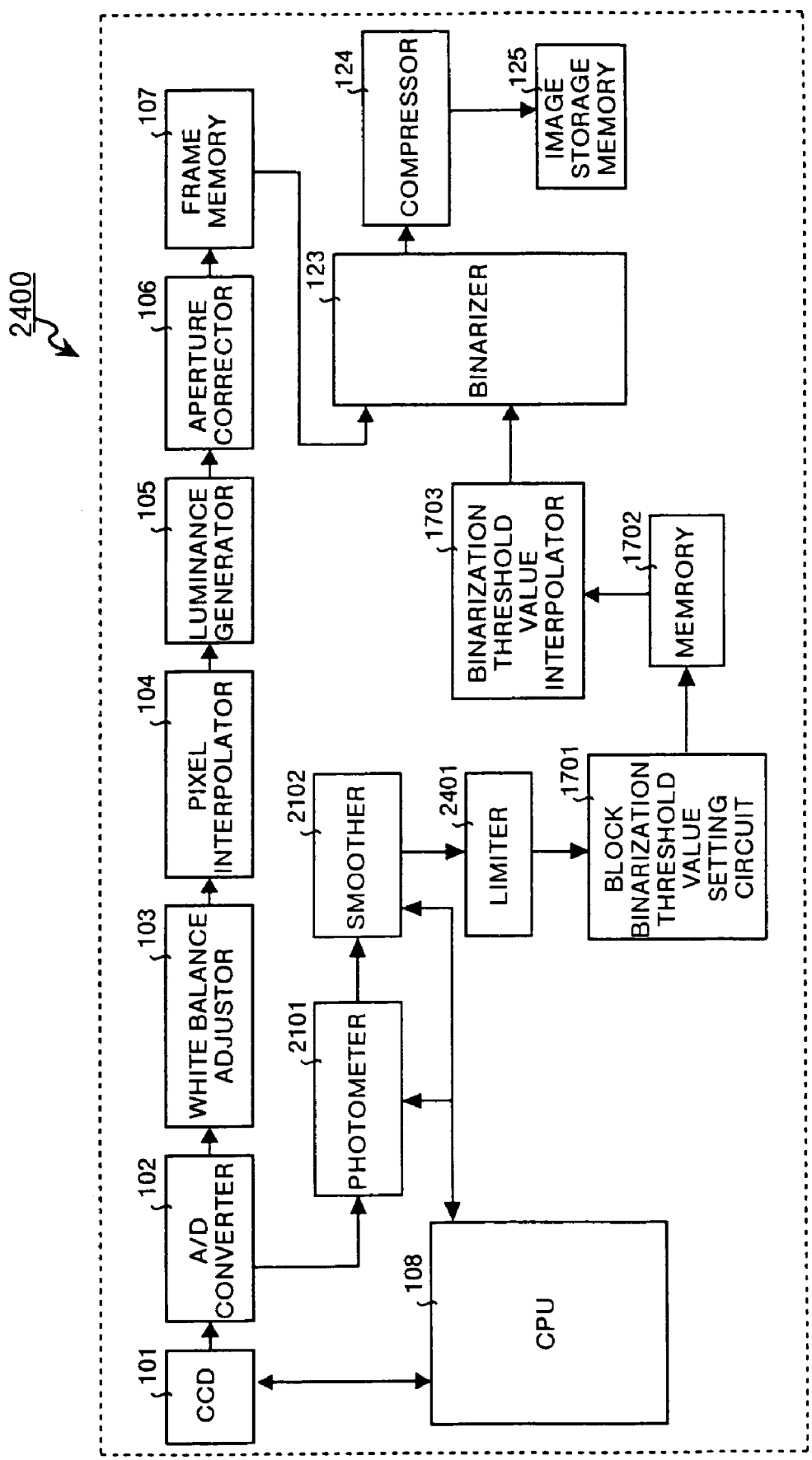
FIG. 24 is a block diagram showing an example of the apparatus structure when an image pickup apparatus of the twelfth embodiment of the present invention is used in a digital camera.

The twelfth embodiment explained below relates to an image pickup apparatus which calculates binarization threshold values to be applied to each individual pixel within a predetermined block based on photometric values which have been limited to a predetermined range, is used in a digital camera. FIG. 24 is a diagram showing an example of the structure when such an image pickup apparatus is used in a digital camera.

The digital camera 2400 is provided with the CCD 101, the A/D converter 102, the white balance adjustor 103, the pixel interpolator 104, the luminance generator 105, the aperture corrector 106, the frame memory 107, the CPU 108, the photometer 2101, the smoother 2102, a limiter 2401, the screen binarization threshold value setting circuit 1701, the memory 1702, the binarization threshold value interpolator 1703, the binarizer 123, the compressor 124, and the image storage memory 125. Note that a section for generating color difference signals is omitted.

The CCD 101 converts light converged by a not shown optical system of the digital camera 2400 into electric signals and outputs R, G, B analog signals for each pixel forming a multi-valued image. The output analog signals are converted into digital signals by the A/D converter 102. As they pass through the white balance adjustor 103, the pixel interpolator 104, the luminance generator 105, and the aperture corrector 106, the digital signals undergo processing such as luminance value interpolation, extraction, and the like and are then temporarily stored in the frame memory 107.

The CPU 108 controls each of the circuits and members of the digital camera 2400. The photometer 2101 is provided with the automatic exposure (AE) detection mechanism for performing photometry on an object before an image is photographed, and measures the brightness of each screen based on digital signals output from the A/D converter 102. The method of the photometry may, for example, comprise measurement by adding the luminance values of the pixels. At this time, the CPU 108 can also sample photometric values to be used in the addition by the photometer 2101.

The smoother 2102 smoothes the photometric values of each screen obtained by the photometer 2101 and outputs them as ave(i, j) to the limiter 2105. In the limiter 2401, the ave(i, j) is limited by a preset lower limit value so that mean photometric values which are too low are prevented from being output.

The screen binarization threshold setting circuit 1701 sets the binarization threshold value TH(i, j) on the basis of the ave(i, j). The block binarization threshold values for all the blocks are stored in the memory 1702. The binarization threshold values for individual pixels are next calculated by the binarization threshold value interpolator 1703 using the block binarization threshold values for all the blocks. The luminance values of each pixel are read simultaneously from the frame memory 107 while the binarization threshold values for the pixels are being calculated. The luminance values and the binarization threshold values are input into the binarizer 123. In the binarizer 123, the binarization threshold values and the luminance values are compared and the luminance values are binarized. The binarized image then undergoes image compression in the compressor 124 appropriate to a binarized image such as MH or MMR. The compressed image is then stored in the image storage memory 125. Note that a digital camera is achievable with the same type of structure even when a CMOS sensor is used instead of the CCD 101.

Figure 25:
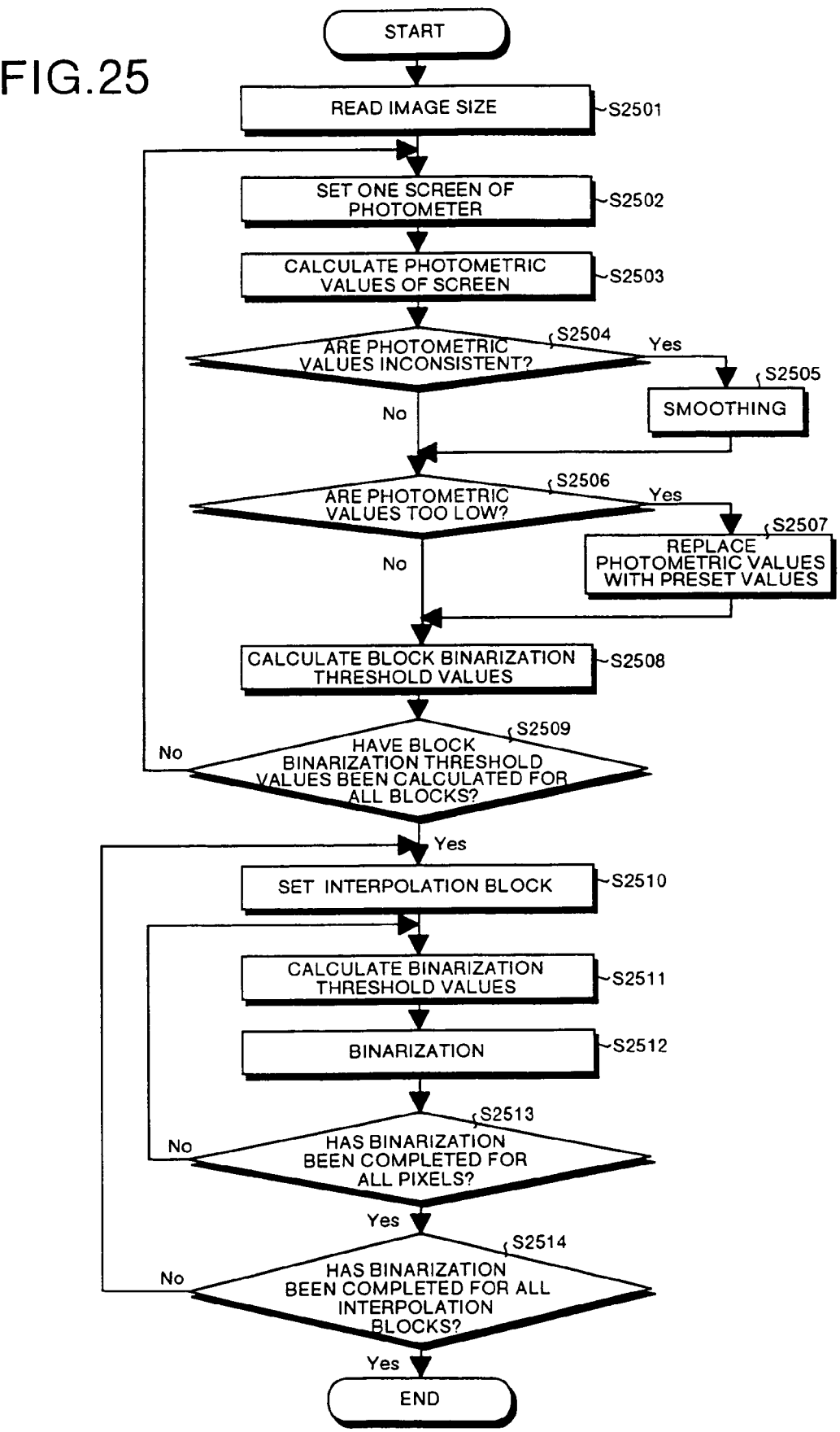
FIG. 25 is a flow chart showing the flow of image data processing as far as the binarization of a multi-valued image in a digital camera of the twelfth embodiment.

Next, the flow of the processing until a multi-valued image is binarized will be described. FIG. 25 is a flow chart showing the flow of image data processing until a multi-valued image is binarized. Firstly, the CPU 108 reads the size of the image from the CCD 101 (step S2501). Next, the CPU 108 sets one screen G(i, j) from among the photometric values output from the photometer 2101 (step S2502) and calculates the mean value of that screen (step S2503). The mean may be determined using all the photometric values or using an appropriate sampling thereof.

Next, a determination is made as to whether or not the mean value of the photometric values of the screen is inconsistent with the mean values of the photometric values of adjacent screens (step S2504). If the mean value is inconsistent (i.e. the result of determination in step S2504 is YES), then the mean value of the photometric values is smoothed using the smoother 2102 (step S2505). If the mean value is not inconsistent (i.e. the result of determination in step S2504 is NO), or alternatively, if the smoothing processing of step S2505 has been completed, a determination is then made as to whether or not the photometric values are too low (step S2506). If the photometric values are too low (i.e. if the result of determination in step S2506 is YES), those photometric values are replaced with predetermined values (step S2507). If the photometric values are not too low (i.e. if the result of determination in step S2506 is NO), or alternatively, if the replacement processing of step S2507 has been completed, the block binarization threshold value TH(i, j) of the block corresponding to the screen is calculated based on the photometric values of the screen G(i, j) (step S2508).

A determination is then made as to whether or not a block binarization threshold value has been calculated for all the blocks (step S2509). If the block binarization threshold values of all the blocks have been calculated (i.e. if the result of determination in step S2509 is YES), the processing routing moves to the next step. If the block binarization threshold values of all the blocks has not been calculated (i.e. if the result of determination in step S2509 is NO), then the block adjacent to the block G(i, j) (for example, G(i+1, j)) is set and steps S2502 to S2509 are repeated.

When block binarization threshold values have been calculated for all the blocks (i.e. when the result of determination in step S2509 is YES), an interpolation block is set (step S2510). The binarization threshold value interpolator 1703 then calculates binarization threshold values th(x, y) of each individual pixel by interpolation using the binarization threshold values (step S2511) Note that x and y are natural numbers which represent the position of each pixel in an image. Furthermore, the pixels read from the frame memory 107 (here taken as g(x, y)) are binarized using the above binarization threshold values th(x, y) (step S2512). A determination is then made as to whether or not binarization processing has been completed for all the pixels (step S2513) If binarization processing has not been completed for all the pixels (i.e. if the result of determination in step S2513 is NO), then a pixel adjacent to the pixel g(x, y) (e.g. the pixel g(x+1, y)) is set and steps S2511 to S2513 are repeated.

If, however, binarization processing has been completed for all the pixels (i.e. if the result of determination in step S2513 is YES), a determination is then made as to whether or not binarization has been completed in all the interpolation blocks (step S2514). If binarization has not been completed in all the interpolation blocks (i.e. if the result of determination in step S2514 is NO), then steps S2510 to S2514 are repeated. If binarization has been completed in all the interpolation blocks (i.e. if the result of determination in step S2514 is YES), the processing is ended.

In this twelfth embodiment, because binarization threshold values are set using information (photometric values) obtained from an automatic photometric section provided in a digital camera, separate processing for setting binarization threshold values is unnecessary. As a result, the circuit structure can be simplified and costs reduced. Further, because separate binarization threshold value calculation processing is unnecessary, power consumption can also be reduced. In addition, even if pinpoint reflections due to a light source are present in an image, high quality binarization of a multi-valued image is possible. Furthermore, by using a smoother and limiter in combination, binarization threshold values are efficiently set. Moreover, because binarization threshold values to be applied to each individual pixel in an interpolation block are set and binarization performed based on photometric values, high quality image processing is possible. In particular, when photographing notice boards, in cases such as when each character is small or characters in a portion of the area are small, high quality partial binarization of the relevant areas is possible.

Figure 26:
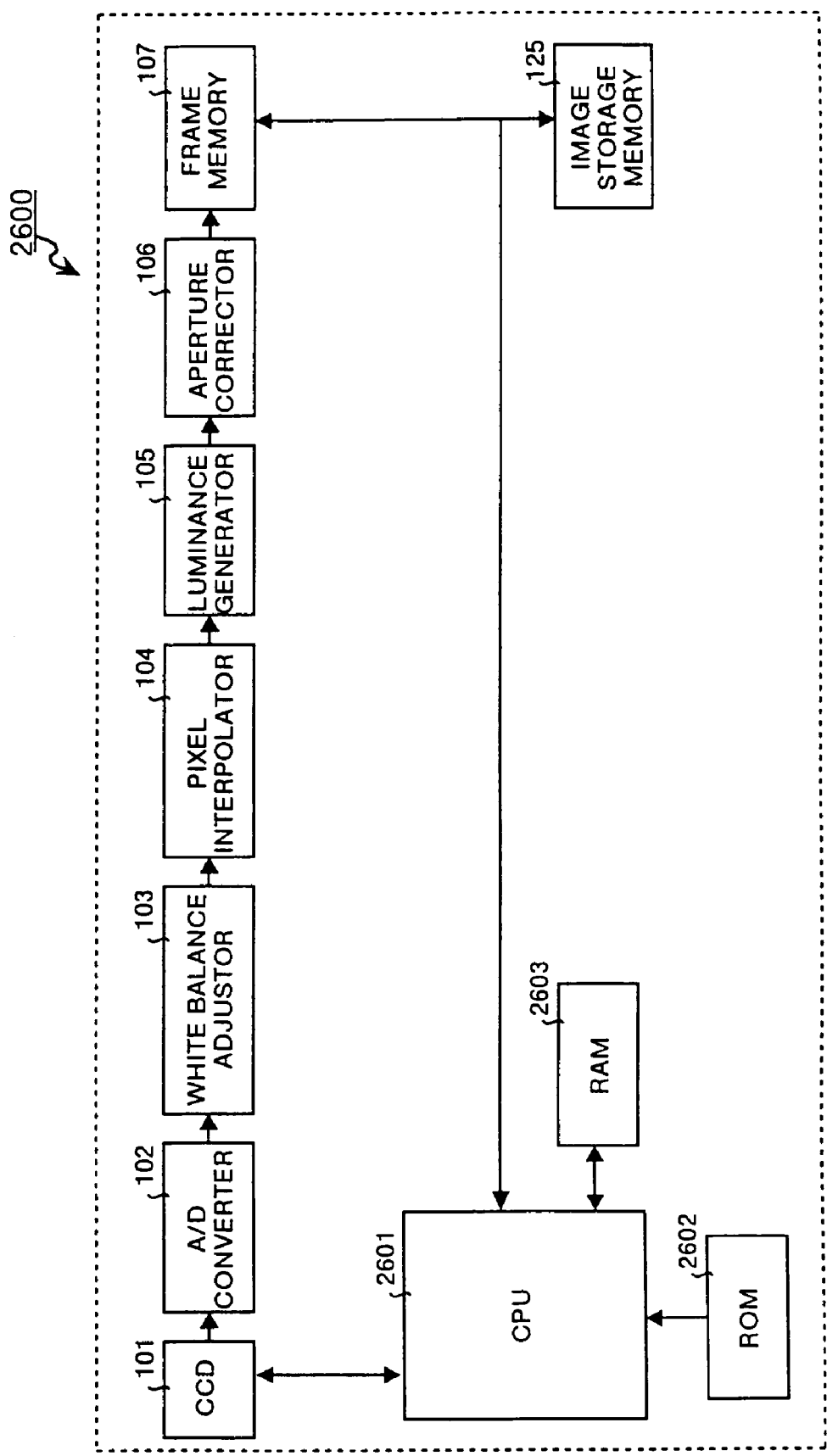
FIG. 26 is a block diagram showing an example of the apparatus structure from an image input to a recording of a binarized image when an image pickup apparatus, which performs image binarization in a CPU by software processing, is used in a digital camera.

The thirteenth embodiment explained below relates to an image pickup apparatus which performs image binarization by software processing in the CPU. FIG. 26 is a block diagram showing an example of the apparatus structure from input of an image until a binarized image is recorded when an image pickup apparatus which performs image binarization by software processing in the CPU is used in a digital camera. Note that, in the present embodiment, structural elements that are identical to those described in each of the previously described embodiments are given the same descriptive symbols and a detailed description thereof is omitted. The description given here is mainly of those portions which are different to previous embodiments.

The digital camera 2600 comprises the CCD 101, the A/D converter 102, the white balance adjustor 103, the pixel interpolator 104, the luminance generator 105, the aperture corrector 106, the frame memory 107, a CPU 2601, ROM 2602, RAM 2603, and the image storage memory 125. A section for generating color difference signals is omitted.

The CCD 101 converts light converged by a not shown optical system of the digital camera 2600 into electrical signals and outputs R, G, B analog signals of each pixel constituting the multi-valued image. The outputted analog signals are converted into digital signals by the A/D converter 102. The digital signals then undergo various processing such as interpolation of the luminance values, extraction and the like as they pass through the white balance adjustor 103, the pixel interpolator 104, the luminance generator 105, and the aperture corrector 106, and are then stored temporarily in the frame memory 107.

The CPU 2601 controls each of the circuits and members of the digital camera 2600 and has the function of binarizing the image. A software program for performing the binarization function is stored in the ROM 2602 connected to the CPU2601. The RAM 2603 stores data such as image data and the like and acts as a work area for performing the binarization processing.

The software program for performing the functions of the mean luminance calculator, the low luminance threshold value setter, the binarization threshold value setting circuit, the binarization threshold value interpolator, the binarizer, the compressor, and the like which have been described in the previous embodiments is stored in the ROM 2602. The mean luminance calculation, the binarization threshold value setting, the binarization, the compression of the binarized image and the like are performed in the CPU 2601 through the program being run. An image that has been binarized and compressed in the CPU 2601 is stored in the image storage memory 125.

Depending on the mode of use, a software program for performing the functions of the photometer, the smoother, the limiter, the block binarization threshold value setting circuit, the binarization threshold value interpolator, the binarizer, the compressor, and the like may be stored in the ROM 2602 in the digital camera 2600, and the binarization threshold value setting, the binarization, the compression of the binarized image and the like can be performed by the running of the program in the CPU 2601. An image that has been binarized and compressed in the CPU 2601 is stored in the image storage memory 125. It is also possible to use a CMOS sensor instead of the CCD 101.

In this thirteenth embodiment, because each function is performed by the CPU 2601 and the ROM 2602, there is no need for a separate section to perform each of the functions and development costs can be reduced. This allows a low cost digital camera to be provided. Moreover, by upgrading the software, it is possible to constantly provide new algorithms.

Figure 27:
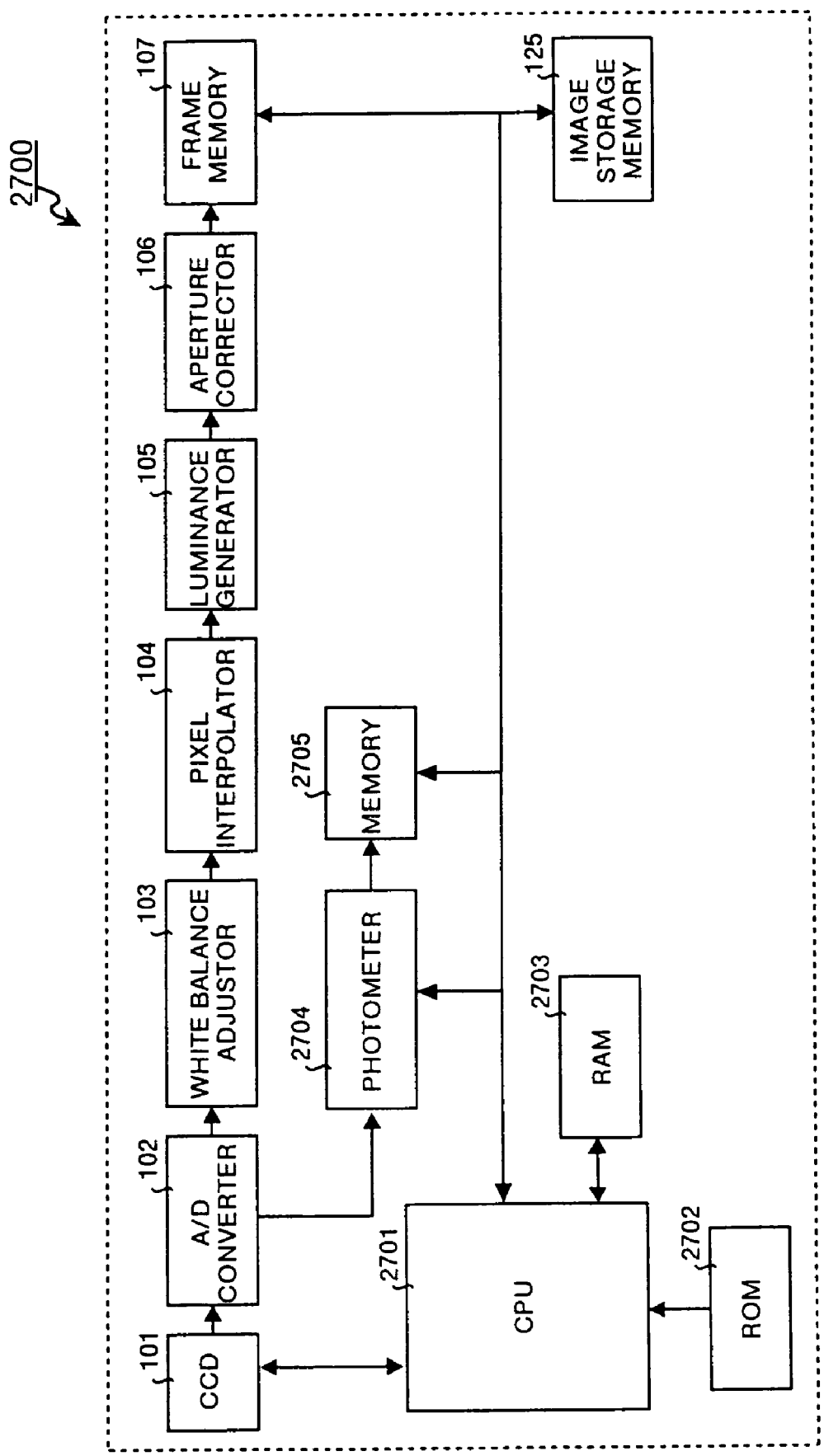
FIG. 27 is a block diagram showing the apparatus structure from an image input to a recording of a binarized image when an image pickup apparatus which performs image binarization in a CPU by software processing is used in a digital camera.

The fourteenth embodiment explained below relates to an image pickup apparatus provided with a photometer for performing image binarization in the CPU by software processing. FIG. 27 is a block diagram showing the apparatus structure from input of an image until a binarized image is recorded when an image pickup apparatus which performs image binarization by software processing in the CPU is used in a digital camera. Note that, in the present embodiment, a detailed description of structural elements that are identical to those of the thirteenth embodiment is omitted. The description given here is mainly of those portions that are different to the thirteenth embodiment.

The digital camera 2700 comprises the CCD 101, the A/D converter 102, the white balance adjustor 103, the pixel interpolator 104, the luminance generator 105, the aperture corrector 106, the frame memory 107, a CPU 2701, ROM 2702, RAM 2703, a photometer 2704, memory 2705, and the image storage memory 125. A section for generating color difference signals is omitted.

The CCD 101 converts light converged by a not shown optical system of the digital camera 2700 into electrical signals and outputs R, G, B analog signals of each pixel constituting the multi-valued image. The outputted analog signals are converted into digital signals by the A/D converter 102. The digital signals then undergo various processing such as interpolation of the luminance values, extraction, and the like as they pass through the white balance adjustor 103, the pixel interpolator 104, the luminance generator 105, and the aperture corrector 106, and are then stored temporarily in the frame memory 107.

The photometer 2704 is provided with automatic exposure (AE) detection mechanism for performing photometry on an object before an image is photographed, and measures the brightness of each screen based on digital signals output from the A/D converter 102. The method of the photometry is measurement by adding the luminance values of the pixels. At this time, it is also possible for the CPU 2701 to sample the photometric values to be used in the addition by the photometer 2704. Because it is possible to generate luminance signals at the same time as calculate mean luminance values in the photometer 2704, the amount of the calculation in the CPU 2701 is reduced, and the processing from the photography of the image to the storage of the binary image can be more rapidly performed compared to the thirteenth embodiment.

In addition to the function of controlling the each of the circuits and members of the digital camera 2700, the CPU 2701 is provided with an image binarization function. A software program for performing the binarization function is stored in the ROM 2702 connected to the CPU 2701. The RAM 2703 stores data such as image data and the like and acts as a work area for performing the binarization processing.

A software program for performing the functions of the smoother, the limiter, the block binarization threshold value setting circuit, the binarization threshold value interpolator, the binarizer, the compressor, and the like may be stored in the ROM 2702, and the binarization threshold value setting, the binarization, the compression of the binarized image and the like can be performed by the running of the program in the CPU 2701. An image that has been binarized and compressed in the CPU 2701 is stored in the image storage memory 125. Depending on the mode of use, it is also possible to use a CMOS sensor instead of the CCD 101.

In this fourteenth embodiment, because each function is performed by the CPU 2701 and the ROM 2702, in the same way as in the thirteenth embodiment, there is no need for a separate section to perform each of the functions and development costs can be reduced. This allows a low cost digital camera to be provided. Moreover, by upgrading the software, it is possible to constantly provide new algorithms.

Figure 28:
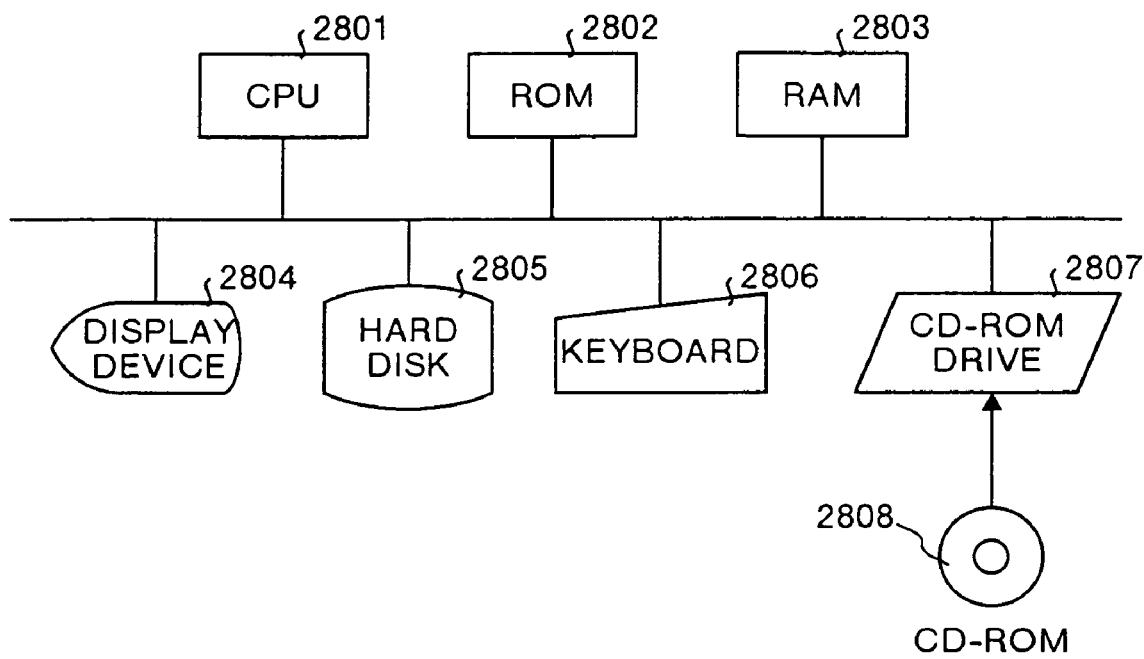
FIG. 28 is a diagram showing an example of the structure of a computer system when performing the present invention using software.

The present invention can also be achieved using software in addition to the above-described embodiments. FIG. 28 shows an example of the computer system which can realized the present invention using software.

In FIG. 28, CPU 2801 performs the overall control of the apparatus based on a control program; ROM 2802 stores the control program; 2803 is RAM; display device 2804 displays input and output states of a computer; 2805 is a hard disk; keyboard 2806 is used to input character strings and the like; 2807 is a CD-ROM drive. CD-ROM 2808 serves as a computer readable storage medium on which a program for executing the image binarization method of the present invention is recorded.

In the computer system having the above structure, a program for executing the image binarization method of the present invention is stored on the CD-ROM 2808. This program is read and activated by the control and processing of the CPU 2801, thus allowing image binarization processing to be performed. The binarized information is output to the hard disk 2805 or the like.

As has been described above, with the image binarization apparatus according to one aspect of the present invention, low luminance values can be removed from an object block based on mean luminance values of the surrounding blocks, and binarization threshold values can be set for the object blocks based on the mean of the luminance values from which the low luminance values have been removed. Consequently, high quality binarization of a multi-valued image is possible.

With the image binarization apparatus according to another aspect of the present invention, low luminance values can be removed based on mean luminance values of the surrounding blocks, and binarization threshold values can be set for the object blocks based on the mean of the luminance values from which the low luminance values have been removed. Moreover, binarization threshold values to be applied to each pixel within an interpolation block can be set based on binarization threshold values of adjacent object blocks. Consequently, high quality binarization of a multi-valued image is possible.

With the image binarization apparatus according to still another aspect of the present invention, low luminance values can be removed from an object block based on mean luminance values of the surrounding blocks, and the mean of the luminance values from which the low luminance values have been removed can be rounded to values within a predetermined range. Moreover, binarization threshold values can be set for the object blocks based on these values. Consequently, high quality binarization of a multi-valued image is possible.

With the image binarization apparatus according to still another aspect of the present invention, low luminance values can be removed based on mean luminance values of the surrounding blocks, and the mean of the luminance values from which the low luminance values have been removed can be rounded to values within a predetermined range. Moreover, binarization threshold values can be set for the object blocks based on these values and binarization threshold values to be applied to each pixel within an interpolation block can be set based on binarization threshold values of adjacent object blocks. Consequently, high quality binarization of a multi-valued image is possible.

Further, the size of created blocks is changed in accordance with the image size or with the total number of pixels of the multi-valued image. As a result, a suitable block size for the size of the characters can be selected in accordance with the image size or with the total number of pixels of the multi-valued image. Consequently, high quality binarization of a multi-valued image is possible.

Further, the size or shape of blocks to be created is changed in accordance with the positions of blocks to be created within the multi-valued image. As a result, detailed corrections which arising from the optical system such as peripheral light reduction can be performed. Consequently, high quality binarization of a multi-valued image is possible.

Further, the image binarization apparatus comprises a sampling unit which samples pixels which form the multi-valued image, and the luminance value output unit outputs luminance values of pixels sampled by the sampling unit so that the number of pixels when a mean luminance value in a block is calculated can be reduced. Consequently, high quality binarization of a multi-valued image can be performed rapidly and at a low level of power consumption.

Further, the sampling unit sets a sampling interval used in the sampling in accordance with the image size, the total number of pixels, or the block size. As a result, even if the block size changes, the number of pixels can be reduced or kept constant when calculating mean luminance values within object blocks. Consequently, high quality binarization of a multi-valued image can be performed rapidly and at a low level of power consumption.

Further, the mean luminance value calculation unit comprises an adding unit for adding the luminance values of each pixel and a counting unit for counting the number of pixels added by the adding unit, and when the number of pixels counted by the counting unit is a power of two, the adding unit determines a mean luminance value. As a result, a divider is not necessary when calculating a mean value and a simple structure using only an adder can be employed. Consequently, high quality binarization of a multi-valued image can be performed rapidly and at a low level of power consumption.

With the image pickup apparatus according to still another aspect of the present invention, binarization threshold values of created blocks can be set on the basis of smoothed photometric values of the created screens. Consequently, high quality binarization of a multi-valued image is possible.

With the image pickup apparatus according to still another aspect of the present invention, binarization threshold values to be applied to each pixel of an interpolation block can be set on the basis of smoothed photometric values of adjacent created screens. Consequently, high quality binarization of a multi-valued image is possible.

With the image pickup apparatus according to still another aspect of the present invention, the photometric values of the created screens can be rounded to within a predetermined range and the binarization threshold values of the created blocks can be set based on these values. Consequently, high quality binarization of a multi-valued image is possible.

With the image pickup apparatus according to still another aspect of the present invention, the photometric values of the adjacent created screens can be rounded to within a predetermined range, and the binarization threshold values to be applied to each pixel of the interpolation blocks can be set based on these values. Consequently, high quality binarization of a multi-valued image is possible.

Further, the screens created by the screen division unit are identical to blocks created by the block division unit. As a result, it is possible to enhance the correlation between a photometric value of a screen and a luminance value of a block. Consequently, high quality binarization of a multi-valued image is possible.

With the image binarization method according to still another aspect of the present invention low luminance values of object blocks can be removed on the basis of mean luminance values of surrounding blocks, and binarization threshold values of the object blocks can be set on the basis of the mean of the luminance values from which the low luminance values have been removed. Consequently, high quality binarization of a multi-valued image is possible.

With the image binarization method according to still another aspect of the present invention, low luminance values can be removed on the basis of mean luminance values of surrounding blocks, and binarization threshold values of the object blocks can be set on the basis of the mean of the luminance values from which the low luminance values have been removed. In addition, binarization threshold values to be applied to each pixel within an interpolation block can be set based on binarization threshold values of adjacent object blocks. Consequently, high quality binarization of a multi-valued image is possible.

With the image binarization method according to still another aspect of the present invention, low luminance values of object blocks can be removed on the basis of mean luminance values of surrounding blocks, and the unit of the luminance values from which low luminance values have been removed can be rounded to within a predetermined range. In addition, binarization threshold values of object blocks can be set based on these values. Consequently, high quality binarization of a multi-valued image is possible.

With the image binarization method according to still another aspect of the present invention, low luminance values can be removed on the basis of mean luminance values of surrounding blocks, and the unit of the luminance values from which low luminance values have been removed can be rounded to within a predetermined range. In addition, binarization threshold values of object blocks can be set based on these values and binarization threshold values to be applied to each pixel of an interpolation block can be set based on binarization threshold values of adjacent object blocks. Consequently, high quality binarization of a multi-valued image is possible.

Further, in the block division step, the size of an object block is changed in accordance with the image size of the multi-valued image or with the total number of pixels of the multi-valued image. As a result, it is possible to select a block size appropriate to the size of the characters in accordance with the image size or total number of pixels. Consequently, high quality binarization of a multi-valued image is possible.

Further, in the block division step, the size or shape of blocks to be created is changed in accordance with the positions of blocks to be created within the multi-valued image.

As a result, detailed corrections arising from the optical system such as peripheral light reduction are possible. Consequently, high quality binarization of a multi-valued image is possible.

Further, a sampling step for sampling pixels which form the multi-valued image is provided and, in the low luminance value removal step, using pixels sampled in the sampling step, luminance values below the low luminance threshold value are removed from luminance values of the pixels and only luminance values which exceed the threshold luminance value are output. As a result, the number of pixels used when calculating a mean luminance value within a block can be reduced. Consequently, high quality binarization of a multi-valued image can be achieved rapidly and at a low level of power consumption.

Further, a sampling step for sampling pixels which form the multi-valued image is provided and, in the mean luminance value calculation step, mean luminance values are calculated using pixels sampled in the sampling step. As a result, the number of pixels used when calculating a mean luminance value within a block can be reduced. Consequently, high quality binarization of a multi-valued image can be achieved rapidly and at a low level of power consumption.

Further, in the sampling step, a sampling interval used in the sampling is set in accordance with the image size, the total number of pixels, or the block size. As a result, the number of pixels used when calculating a mean luminance value within a block can be reduced or kept constant even if the size of the block changes. Consequently, high quality binarization of a multi-valued image can be achieved rapidly and at a low level of power consumption.

With the image pickup method according to still another aspect of the present invention, binarization threshold values of created blocks can be set on the basis of smoothed photometric values of a created screen. Consequently, high quality binarization of a multi-valued image is possible.

With the image pickup method according to still another aspect of the present invention, binarization threshold values applied to each pixel of an interpolation block are set on the basis of smoothed photometric values of adjacent created screens. Consequently, high quality binarization of a multi-valued image is possible.

With the image pickup method according to still another aspect of the present invention, photometric values of created screens are rounded to values within a predetermined range and binarization threshold values of created blocks are set based on these values. Consequently, high quality binarization of a multi-valued image is possible.

With the image pickup method according to still another aspect of the present invention, photometric values of adjacent created screens are rounded to values within a predetermined range and binarization threshold values applied to each pixel of the interpolation blocks are set based on these values. Consequently, high quality binarization of a multi-valued image is possible.

Further, the screens created in the screen division step are identical to blocks created in the block division step. As a result, the correlation between the screen photometric values and the block luminance values is increased. Consequently, high quality binarization of a multi-valued image is possible.

The computer readable recording medium according to still another aspect of the present invention enables a computer to function on the basis of each step of the image binarization method described above.

The present document incorporated by reference the entire contents of Japanese priority document, 11-113761 filed in Japan on Apr. 21, 1999 and 2000-035946 filed in Japan on Feb. 14, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image binarization apparatus comprising:
   a block division unit which divides a multi-valued image into blocks;
   a luminance value output unit which outputs a luminance value of each pixel forming the multi-valued image;
   a binarization threshold value setting unit which sets a binarization threshold value to be used when binarizing the multi-valued image;
   a low luminance threshold value setting unit which sets a low luminance threshold value to be used when removing low luminance values;
   a low luminance value removal unit which inputs luminance values of each pixel from among luminance values output by said luminance value output unit, removes luminance values that are lower than the low luminance threshold value set by said low luminance threshold value setting unit, and outputs only those luminance values which exceed the low luminance threshold value; and
   a mean luminance value calculation unit which calculates a mean luminance value of the luminance values output by said low luminance value removal unit,
   wherein said low luminance threshold value setting unit sets the low luminance threshold value based on mean luminance values of at least selected of the blocks; and
   said binarization threshold value setting unit sets the binarization threshold values based on mean luminance values of the blocks.

2. The image binarization apparatus according to claim 1, wherein said block division unit changes the size of created blocks in accordance with the image size of the multi-valued image or with the total number of pixels of the multi-valued image.

3. The image binarization apparatus according to claim 1, wherein said block division unit changes the size or shape of blocks to be created in accordance with the positions of blocks to be created within the multi-valued image.

4. The image binarization apparatus according to claim 1 further comprising a sampling unit which samples pixels which form the multi-valued image,
   wherein said luminance value output unit outputs luminance values of pixels sampled by said sampling unit.

5. The image binarization apparatus according to claim 4, wherein said sampling unit sets a sampling interval used in the sampling in accordance with the image size, the total number of pixels, or the block size.

6. The image binarization apparatus according to claim 1, wherein said mean luminance value calculation unit comprises an adding unit which adds the luminance values of each pixel; and a counting unit which counts the number of pixels added by the adding unit, and
   when the number of pixels counted by said counting unit is a power of two, said adding unit determines a mean luminance value.

7. An image binarization apparatus comprising:
   a block division unit which divides a multi-valued image into blocks;
   a luminance value output unit which outputs a luminance value of each pixel forming the multi-valued image;
   a binarization threshold value setting unit which sets a binarization threshold value to be used when binarizing the multi-valued image;
   a low luminance threshold value setting unit which sets a low luminance threshold value to be used when removing low luminance values;
   a low luminance value removal unit which inputs luminance values of each pixel from among luminance values output by said luminance value output unit, removes luminance values that are lower than the low luminance threshold value set by said low luminance threshold value setting unit, and outputs only those luminance values which exceed the low luminance threshold value;
   a mean luminance value calculation unit which calculates a mean luminance value of the luminance values output by said low luminance value removal unit;
   a block binarization threshold value setting unit which sets a block binarization threshold value which is a binarization threshold value applied to at least selected of the blocks based on the mean luminance values calculated by said mean luminance value calculation unit; and
   an interpolation block setting unit for setting interpolation blocks which cover pixels extending over two or more adjacent of the selected of the blocks,
   wherein said low luminance threshold value setting unit sets the low luminance threshold value based on mean luminance values of the two or more adjacent of the selected of the blocks; and
   said binarization threshold value setting unit sets the binarization threshold value to be applied to pixels inside the interpolation block based on block binarization threshold values of each of the two or more adjacent of the selected of the blocks bridged by the interpolation block.

8. The image binarization apparatus according to claim 7, wherein said block division unit changes the size of created blocks in accordance with the image size of the multi-valued image or with the total number of pixels of the multi-valued image.

9. The image binarization apparatus according to claim 7, wherein said block division unit changes the size or shape of blocks to be created in accordance with the positions of blocks to be created within the multi-valued image.

10. The image binarization apparatus according to claim 7 further comprising a sampling unit which samples pixels which form the multi-valued image,
    wherein said luminance value output unit outputs luminance values of pixels sampled by said sampling unit.

11. The image binarization apparatus according to claim 10,
    wherein said sampling unit sets a sampling interval used in the sampling in accordance with the image size, the total number of pixels, or the block size.

12. The image binarization apparatus according to claim 7, wherein said mean luminance value calculation unit comprises an adding unit which adds the luminance values of each pixel; and a counting unit which counts the number of pixels added by the adding unit, and
    when the number of pixels counted by said counting unit is a power of two, said adding unit determines a mean luminance value.

13. An image binarization apparatus comprising:
a block division unit which divides a multi-valued image into blocks;
a luminance value output unit which outputs a luminance value of each pixel forming the multi-valued image;
a binarization threshold value setting unit which sets a binarization threshold value to be used when binarizing the multi-valued image;
a mean luminance value calculation unit which receives luminance values of each pixel forming at least selected of the blocks from among luminance values output by said luminance value output unit, and calculates mean luminance values of the selected of the blocks; and
a luminance value limiting unit which limits a range of mean luminance values calculated by said mean luminance value calculation unit so that the values are within a predetermined spread,
wherein said binarization threshold value setting unit sets binarization threshold values of the selected of the blocks based on the mean luminance values the range of which is limited by said luminance value limiting unit.

14. The image binarization apparatus according to claim 13, wherein said block division unit changes the size of created blocks in accordance with the image size of the multi-valued image or with the total number of pixels of the multi-valued image.

15. The image binarization apparatus according to claim 13, wherein said block division unit changes the size or shape of blocks to be created in accordance with the positions of blocks to be created within the multi-valued image.

16. The image binarization apparatus according to claim 13 further comprising a sampling unit which samples pixels which form the multi-valued image,
wherein said luminance value output unit outputs luminance values of pixels sampled by said sampling unit.

17. The image binarization apparatus according to claim 16,
wherein said sampling unit sets a sampling interval used in the sampling in accordance with the image size, the total number of pixels, or the block size.

18. The image binarization apparatus according to claim 13, wherein said mean luminance value calculation unit comprises an adding unit which adds the luminance values of each pixel; and a counting unit which counts the number of pixels added by the adding unit, and
when the number of pixels counted by said counting unit is a power of two, said adding unit determines a mean luminance value.

19. An image binarization apparatus comprising:
a block division unit which divides a multi-valued image into blocks;
a luminance value output unit which outputs a luminance value of each pixel forming the multi-valued image;
binarization threshold value setting unit which sets a binarization threshold value to be used when binarizing the multi-valued image;
a mean luminance value calculation unit which receives luminance values of each pixel forming at least selected of the blocks from among luminance values output by said luminance value output unit, and calculates mean luminance values of the selected of the blocks;
a luminance value limiting unit which limits a range of the mean luminance values calculated by said mean luminance value calculation unit so that the values are within a predetermined spread;
a block binarization threshold value setting unit which sets a block binarization threshold value which is a binarization threshold value applied to the selected of the blocks based on the mean luminance values calculated by said mean luminance value calculation unit; and
an interpolation block setting unit which sets interpolation blocks which cover pixels extending over two or more adjacent of the selected of the blocks,
wherein said binarization threshold value setting unit sets binarization threshold values applied to pixels inside the interpolation block based on block binarization threshold values of each of the two or more adjacent of the selected of the blocks bridged by the interpolation block.

20. The image binarization apparatus according to claim 19, wherein said block division unit changes the size of created blocks in accordance with the image size of the multi-valued image or with the total number of pixels of the multi-valued image.

21. The image binarization apparatus according to claim 19, wherein said block division unit changes the size or shape of blocks to be created in accordance with the positions of blocks to be created within the multi-valued image.

22. The image binarization apparatus according to claim 19 further comprises a sampling unit which samples pixels which form the multi-valued image,
wherein said luminance value output unit outputs luminance values of pixels sampled by said sampling unit.

23. The image binarization apparatus according to claim 22,
wherein said sampling unit sets a sampling interval used in the sampling in accordance with the image size, the total number of pixels, or the block size.

24. The image binarization apparatus according to claim 19, wherein said mean luminance value calculation unit comprises an adding unit which adds the luminance values of each pixel; and a counting unit which counts the number of pixels added by the adding unit, and
when the number of pixels counted by said counting unit is a power of two, said adding unit determines a mean luminance value.

25. An image pickup apparatus comprising:
an image pickup unit which picks up an image of an object of a photograph;
a screen division unit which divides the photographed object into a plurality of Screens;
a photometry unit which measures light of screens created by said screen division unit;
a block division unit which divides a multi-valued image picked up by said image pickup unit into blocks;
a binarization threshold value setting unit which sets binarization threshold values used when binarizing the multi-valued image; and
a photometric value limiting unit which limits a spread of photometric values measured by said photometry unit so that the values are within a predetermined range,
wherein said binarization threshold value setting unit sets binarization threshold values of blocks created by said block division unit based on photometric values the range of which has been limited by said photometric value limiting unit.

26. The image pickup apparatus according to claim 25, wherein screens created by said screen division unit are identical to blocks created by said block division unit.

27. An image pickup apparatus comprising:
an image pickup unit which picks up an image of an object of a photograph;
a screen division unit which divides the object being photographed into a plurality of screens;

a photometry unit which measures light of screens created by said screen division unit;

a block division unit which divides a multi-valued image picked up by said image pickup unit into blocks;

a binarization threshold value setting unit which sets binarization threshold values used when binarizing the multi-valued image;

a photometric value limiting unit which limits a spread of photometric values measured by said photometry unit so that the values are within a predetermined range; and an interpolation block setting unit which sets interpolation blocks which cover an image area extending over two or more adjacent screens from among the screens created by said screen division unit, wherein said binarization threshold value setting unit sets binarization threshold values to be applied to pixels within the interpolation blocks based on photometric values the range of each of which has been limited of the two or more screens bridged by the interpolation block.

28. The image pickup apparatus according to claim 27, wherein screens created by said screen division unit are identical to blocks created by said block division unit.

29. A computer readable medium for storing instructions, which when executed by a computer, causes the computer to perform an image binarization method comprising:

a block division in which the multi-valued image is divided into blocks;

a low luminance threshold value setting in which a low luminance threshold value to be used when removing low luminance values is set based on mean luminance values of adjacent of at least selected of the blocks;

a low luminance value removal in which luminance values below the low luminance threshold value are removed from among luminance values of pixels contained in the selected of the blocks and only luminance values which exceed the low luminance threshold value are output;

a mean luminance value calculation in which luminance values output in the low luminance value removal are input and mean luminance values of the selected of the blocks are calculated; and a binarization threshold value setting in which binarization threshold values to be used in binarization processing of the selected of the blocks are set based on mean luminance values of the selected of the blocks calculated in the mean luminance value calculation.

30. A computer readable medium for storing instructions, which when executed by a computer, causes the computer to perform an image binarization method comprising:

a block division in which the multi-valued image is divided into blocks;

a low luminance threshold value setting in which a low luminance threshold value to be used when removing low luminance values is set based on mean luminance values of adjacent of at least selected of the blocks;

a low luminance value removal in which luminance values below the low luminance threshold value are removed from among luminance values of pixels contained in the selected of the blocks and only luminance values which exceed the low luminance threshold value are output;

a mean luminance value calculation in which luminance values output in the low luminance value removal are input and mean luminance values of the selected of the blocks are calculated;

a block binarization threshold value setting in which a block binarization threshold value which is a binarization threshold value applied to a block is set based on a mean luminance value calculated in the mean luminance value calculation;

an interpolation block setting in which interpolation blocks which cover pixels extending over two or more adjacent of the selected of the blocks are set; and a binarization threshold value setting in which binarization threshold values to be applied to pixels within the interpolation blocks are set based on each block binarization threshold value of the two or more adjacent of the selected blocks bridged by the interpolation block set in the interpolation block setting.

31. A computer readable medium for storing instructions, which when executed by a computer, causes the computer to perform an image binarization method comprising:

a block division in which the multi-valued image is divided into blocks;

a mean luminance value calculation in which mean luminance values of at least selected of the blocks are calculated;

a luminance value limiting in which a spread of mean luminance values calculated in the mean luminance value calculation is limited so that the values are within a predetermined range; and a binarization threshold value setting in which binarization threshold value to be used in binarization processing of the selected of the blocks is set based on mean luminance values the range of which has been limited in the luminance value limiting.

32. A computer readable medium for storing instructions, which when executed by a computer, causes the computer to perform an image binarization method comprising:

a block division in which the multi-valued image is divided into blocks;

a mean luminance value calculation in which mean luminance values of at least selected of the blocks are calculated;

a luminance value limiting in which a spread of mean luminance values calculated in the mean luminance value calculation is limited so that the values are within a predetermined range;

a block binarization threshold value setting in which a block binarization threshold value which is a binarization threshold value applied to the at least selected of the blocks is set based on mean luminance values the range of which has been limited in the mean luminance value limiting;

an interpolation block setting in which interpolation blocks which share pixels extending over two or more adjacent of the selected of the blocks are set; and a binarization threshold value setting in which binarization threshold values to be applied to pixels within the interpolation blocks are set based on each block binarization threshold value of the two or more adjacent of the selected of the blocks bridged by the interpolation block set in the interpolation block setting.

33. A computer readable medium for storing instructions, which when executed by a computer, causes the computer to perform an image pickup method comprising:

a screen division in which an object of a photograph is divided into a plurality of screens;

a photometry in which light of screens created in the screen division is measured;

an image pickup in which an image of the object of the photograph is picked up;

a block division in which a multi-valued image which was picked up in the image pickup is divided into blocks;

a photometric value smoothing in which photometric values measured in the photometry are smoothed; and a binarization threshold value setting in which binarization threshold values of at least selected of the blocks are set based on photometric values smoothed in the photometric value smoothing.

34. A computer readable medium for storing instructions, which when executed by a computer, causes the computer to perform an image pickup method comprising:

a screen division in which an object of a photograph is divided into a plurality of screens;

a photometry in which light of screens created in the screen division is measured;

an image pickup in which an image of the object of the photograph is picked up;

a block division in which a multi-valued image which was picked up in the image pickup is divided into blocks;

a photometric value smoothing in which photometric values measured in the photometry are smoothed;

an interpolation block setting in which interpolation blocks which cover an image area extending over two or more adjacent screens are set from among the screens created in the screen division; and a binarization threshold value setting in which binarization threshold values applied to pixels within the interpolation blocks are set based on smoothed photometric values of each of the two or more screens bridged by the interpolation blocks set in the interpolation block setting.

35. A computer readable medium for storing instructions, which when executed by a computer, causes the computer to perform an image pickup method comprising:

a screen division in which an object of a photograph is divided into a plurality of screens;

a photometry in which light of screens created in the screen division is measured;

an image pickup in which an image of the object of the photograph is picked up;

a block division in which a multi-valued image which was picked up in the image pickup is divided into blocks;

a photometric value limiting in which the spread of photometric values measured in the photometry is limited so that the values are within a predetermined range; and a binarization threshold value setting in which binarization threshold values of the at least selected of blocks are set based on photometric values whose range has been limited in the photometric value limiting.

36. computer readable medium for storing instructions, which when executed by a computer, causes the computer to perform an image pickup method comprising:

a screen division in which an object of a photograph is divided into a plurality of screens;

a photometry in which light of screens created in the screen division is measured;

an image pickup in which an image of the object of the photograph is picked up;

a block division in which a multi-valued image which was picked up in the image pickup is divided into blocks;

a photometric value limiting in which the spread of photometric values measured in the photometry is limited so that the values are within a predetermined range;

an interpolation block setting in which interpolation blocks which cover an image area extending over two or more adjacent screens are set from among the screens created in the screen division; and a binarization threshold value setting in which binarization threshold values applied to pixels within the interpolation blocks are set based on photometric values the range of each of which has been limited of the two or more screens bridged by the interpolation blocks set in the interpolation block setting.

* * * * *

UNITED STATES PATENT AND TRADEMARK OFFICE
CERTIFICATE OF CORRECTION

| | | |
|---|---|---|
| PATENT NO. | : 7,623,727 B2 | Page 1 of 1 |
| APPLICATION NO. | : 11/058191 | |
| DATED | : November 24, 2009 | |
| INVENTOR(S) | : Takahashi | |

It is certified that error appears in the above-identified patent and that said Letters Patent is hereby corrected as shown below:

On the title page, the Terminal Disclaimer information has been omitted. Item (45) and the Notice information should read as follows:

Title Page Item -- (45) **Date of Patent: * Nov. 24, 2009**

( * ) Notice: Subject to any disclaimer, the term of this patent is extended or adjusted under 35 U.S.C. 154(b) by 828 days.

This patent is subject to a terminal disclaimer. --

Signed and Sealed this

Nineteenth Day of January, 2010

David J. Kappos
*Director of the United States Patent and Trademark Office*